US012725392B2

(12) United States Patent
Fuelster et al.

(10) Patent No.: US 12,725,392 B2
(45) Date of Patent: Sep. 1, 2026

(54) SYSTEM FOR DETECTION AND MANAGEMENT OF UNCERTAINTY IN PERCEPTION SYSTEMS

(71) Applicant: DEEP SAFETY GMBH, Berlin (DE)

(72) Inventors: Sven Fuelster, Berlin (DE); Ralph Meyfarth, Berlin (DE)

(73) Assignee: Loris Safety GmbH, Nuremberg (DE)

( * ) Notice: Subject to any disclaimer, the term of this patent is extended or adjusted under 35 U.S.C. 154(b) by 457 days.

(21) Appl. No.: 18/248,884

(22) PCT Filed: Oct. 14, 2021

(86) PCT No.: PCT/EP2021/078519
§ 371 (c)(1),
(2) Date: Apr. 13, 2023

(87) PCT Pub. No.: WO2022/079201
PCT Pub. Date: Apr. 21, 2022

(65) Prior Publication Data

US 2023/0386167 A1 Nov. 30, 2023

(30) Foreign Application Priority Data

Oct. 14, 2020 (EP) .................................... 20201874

(51) Int. Cl.
*G06V 10/26* (2022.01)
*G06V 10/776* (2022.01)
*G06V 10/82* (2022.01)

(52) U.S. Cl.
CPC ............ *G06V 10/26* (2022.01); *G06V 10/776* (2022.01); *G06V 10/82* (2022.01)

(58) Field of Classification Search
CPC ...... G06V 10/764; G06V 10/26; G06V 20/58; G06V 20/588; G06V 20/70; G06V 10/225;
(Continued)

(56) References Cited

U.S. PATENT DOCUMENTS

2020/0226430 A1 * 7/2020 Ahuja ................ G06F 18/2193

OTHER PUBLICATIONS

Kendall, Alex, Vijay Badrinarayanan, and Roberto Cipolla. "Bayesian segnet: Model uncertainty in deep convolutional encoder-decoder architectures for scene understanding." arXiv preprint arXiv:1511.02680 (2015). (Year: 2015).*

(Continued)

*Primary Examiner* — Sumati Lefkowitz
*Assistant Examiner* — Connor L Hansen
(74) *Attorney, Agent, or Firm* — Sheridan Ross P.C.

(57) ABSTRACT

A perception system comprises a segmenting neural network and an uncertainty detector. The segmenting neural network is configured and trained for segmentation of an input image pixel matrix to generate a segment composed of elements that correspond the pixels of the input image pixel matrix. Each element of the segment map is assigned to one of a plurality of object classes the segmenting neural network is trained for by way of class prediction. Elements being assigned to the same object class form a segment of the segment map. The uncertainty detector is configured to generate an uncertainty score map that is composed of elements that correspond the pixels of the input image pixel matrix. Each element of the uncertainty map has an uncertainty score that is determined by the uncertainty detector and reflects an amount of uncertainty involved in a class prediction for a corresponding element in the segment map.

12 Claims, 24 Drawing Sheets

(58) Field of Classification Search
CPC .... G06V 20/695; G06V 10/82; G06V 10/454; G06V 10/776; G06V 10/774; G06T 7/11; G06T 2207/30256; G06T 2207/20081; G06T 2207/20084; G06T 3/4046
See application file for complete search history.

(56) References Cited

OTHER PUBLICATIONS

Loquercio, Antonio, Mattia Segu, and Davide Scaramuzza. "A general framework for uncertainty estimation in deep learning." IEEE Robotics and Automation Letters 5.2 (2020): 3153-3160. (Year: 2020).*
Sato, Kazuki, et al. "Predictable uncertainty-aware unsupervised deep anomaly segmentation." 2019 international joint conference on neural networks (ijcnn). IEEE, 2019. (Year: 2019).*
Devries et al., "Leveraging Uncertainty Estimates for Predicting Segmentation Quality," arXiv, vol. 1807.00502v1, dated Jul. 2, 2018, retrieved from https://arxiv.org/pdf/1807.00502.pdf, 9 pages.
Gal, "Uncertainty in Deep Learning," Dissertation submitted to Department of Engineering, University of Cambridge for the degree of Doctor of Philosophy, Sep. 2016, retrieved from https://www.cs.ox.ac.uk/people/yarin.gal/website/thesis/thesis.pdf, 174 pages.
Ghahramani, "Probabilistic machine learning and artificial intelligence," author edition of paper published in Nature, vol. 521, May 27, 2015, retrieved from https://www.repository.cam.ac.uk/bitstream/handle/1810/248538/Ghahramani%202015%20Nature.pdf, 24 pages.
Goodfellow et al., "Chapter 5: Machine Learning Basics," in Deep Learning, MIT Press, 2016, retrieved from https://www.deeplearningbook.org/contents/ml.html, pp. 96-161.
Goodfellow et al., "Chapter 6: Deep Feedforward Networks," in Deep Learning, MIT Press, 2016, retrieved from https://www.deeplearningbook.org/contents/mlp.html, pp. 164-223.
Jadon, "An Overview of Deep Learning Architectures in Few-Shot Learning Domain," arXiv, vol. 2008.06365v3, Aug. 19, 2020, retrieved from https://arxiv.org/pdf/2008.06365.pdf, 11 pages.
Kendall et al., "Bayesian SegNet: Model Uncertainty in Deep Convolutional Encoder-Decorder Architectures for Scene Understanding," arXiv, vol. 1511.02680v2, Oct. 10, 2016, retrieved from https://www.arxiv.org/pdf/1511.02680v2.pdf. 11 pages.
Kendall et al., "What Uncertainties Do We Need in Bayesian Deep Learning for Computer Vision?," 31st Conference on Neural Information Processing Systems (NIPS 2017), Long Beach, CA, USA, Dec. 5, 2017, 11 pages.
Kim et al., Unsupervised Learning of Image Segmentation Based on Differentiable Feature Clustering, IEEE Transactions on Image Processing, arXiv, vol. 2007.09990v1, Jul. 20, 2020, retrieved from https://arxiv.org/pdf/2007.09990.pdf, 14 pages.
Li et al., "PyTorch Distributed: Experiences on Accelerating Data Parallel Training," VLDB 2020, arXiv, vol. 2006.15704v1, Jun. 28, 2020, retrieved from https://arxiv.org/pdf/2006.15704.pdf, 14 pages.
Luc et al., "Semantic Segmentation using Adversarial Networks," arXiv, vol. 1611.08408, Nov. 25, 2016, retrieved from https://arxiv.org/pdf/1611.08408.pdf, 12 pages.
Schnieders et al., "Fully Convolutional One-Shot Object Segmentation for Industrial Robotics," International Conference on Autonomous Agents and Multiagent Systems (AAMAS 2019), arXiv, vol. 1903.00683v1, Mar. 2, 2019, retrieved from https://arxiv.org/pdf/1903.00683.pdf, 9 pages.
International Search Report and Written Opinion for International (PCT) Patent Application No. PCT/EP2021/078519, dated Jan. 4, 2022, 12 pages.
Extended European Search Report for Europe Patent Application No. 20201874.3, dated Apr. 6, 2021, 10 pages.

* cited by examiner

66

90

92

SYSTEM FOR DETECTION AND MANAGEMENT OF UNCERTAINTY IN PERCEPTION SYSTEMS

CROSS REFERENCE TO RELATED APPLICATIONS

This application is a national stage application under 35 U.S.C. 371 and claims the benefit of PCT Application No. PCT/EP2021/078519 having an international filing date of 14 Oct. 2021, which designated the United States, and which PCT application claimed the benefit of European Patent Application No. 20201874.3 filed 14 Oct. 2020, the contents of each of which are incorporated herein by reference in their entireties.

The invention refers to a system for detection and management of uncertainty in perception systems.

One particular field of application of machine learning or deep learning is computer vision that can for instance be used in perception systems. In computer vision, deep neural networks learn to recognize classes of objects in images. Computer vision includes

- simple classification, in which a whole image is classified with the object class of its most dominant object;
- object detection, in which a neural network predicts bounding boxes around the objects in the image;
- semantic segmentation, in which every pixel of an image is classified (labeled) with the object class of the object to which it belongs;
- optical flow, which predicts a field of vectors of movement for the objects shown;

as well as derived methods like instance segmentation, panoptic segmentation, video segmentation and more. For all these methods, the neural network needs to be trained by means of a training dataset in order to learn classes of objects or features to predict. For supervised learning, this training dataset comprises pairs of an input image and a corresponding label with the desired result (i.e. the object class represented in the input image).

A label can be a simple class name for the whole image in the case of classification; or a pixel-wise hand-labelled image in the case of semantic segmentation. Herein, we will most often refer to the case of semantic segmentation. However, the methods and techniques claimed shall be applicable to all the various computer vision techniques and all the various architectures of neural networks associated with these techniques.

The invention relates in particular to semantic segmentation of images. Images are typically composed of pixels that represent a picture taken by a camera with a lens that projects an image on an image sensor. The image sensor converts the projected picture into a pixel matrix that represents the picture. A picture can for instance be a frame of a video.

Semantic segmentation of an image represented by a pixel matrix serves to assign regions of the image—or more precise: each pixel in a respective segment of an image—to recognized objects. For recognizing objects in an image, typically convolutional neural networks (CNN) are used, for instance fully convolutional neural networks (FCN). Those convolutional neural networks are trained as multi-class classifiers that can detect objects they are trained for in an image. Fully convolutional neural network used for semantic segmentation typically comprises a plurality of convolutional layers for detecting features (i.e. occurrence of objects the CNN is trained for) and pooling layers for down-sampling the output of the convolutional layers in a certain stage. Layer are composed of nodes. Nodes have an input and an output. The input of a node can be connected to some or all outputs of nodes in an anteceding layer thus receiving output values from the outputs of nodes of the anteceding layer. The values a node receives via its inputs are weighted and the weighted inputs are summed up to thus form a weighted sum. The weighted sum is transformed by an activation function of the node into the output of that node.

The structure defined by the layers of a neural network—its topology or architecture—defined prior to training of a neural network During training of a neural network the weights in the nodes of the layers of the neural network are modified until the neural network provides the desired or expected prediction. The neural network thus learns to predict (e.g. recognize) classes of objects or features it is trained for. The parameters created during training of the neural network, in particular the weights for the inputs of the nodes, form a model. Thus, a trained neural network implements a model.

Regarding the convolutional layers, it is known to the skilled person, that these use filter kernel arrays that have a much smaller dimension than the pixel matrix representing the image. The filter kernel arrays are composed of array elements having weight values. A filter kernel array is stepwise moved over the image pixel matrix and each value of a pixel of the image pixel matrix is element wise multiplied with the weight value of the respective element of the filter kernel matrix while the filter kernel matrix "moves over" the image pixel matrix, thus convolving the image pixel matrix. Typically, a plurality of filter kernel arrays are used to extract different low level features.

The convoluted output from such convolution in a convolutional layer may be fed as input to a next convolutional layer and again be convoluted by means of filter kernel arrays. The convoluted output is called a feature map. For instance, for each color channel of a color image, a feature map can be created.

Eventually the convoluted output of a convolution layer can be rectified by means of a non-linear function, for instance a ReLU (Rectified Linear Unit) operator. The ReLU operator is a preferred activation function of the nodes of the convolutional layer, which eliminates all negative values from the output of the convolutional layer. The purpose of the non-linear function is that a network without it could only learn linear relations, because the convolution operation itself is linear, $s(t)=(x*w)(t)$ for learned weights w and input x; cf. https://www.deeplearningbook.org/contents/convnets.html, Eq. 9.2. The non-linear function enables the network to learn non-linear relations. The elimination of negative values is only a side effect of the ReLU, which is not necessary for learning, and—on the contrary—even undesired. A "Leaky ReLU", for instance, does not have this side effect. Most architectures choose ReLU due to its simplicity, $ReLU_{(z)}=max(0, z)$; cf. https://www.deeplearningbook.org/contents/mlp.html, Eq. 6.37. The ReLU operators are part of the respective convolutional layer.

In order to reduce the dimension of the feature map by way of down-sampling, pooling layers are used. One way of down-sampling is called Max-Pooling. When using Max-Pooling, for instance each 2*2 sub-array of the feature map is replaced by a single value that corresponds to the maximum value of the four elements of the 2*2 sub-array.

The down-sampled feature map can again be processed in a convolutional layer. Eventually, the feature map from the final convolutional layer or Pooling-layer is a score map.

For each object class, the neural network is trained for feature score maps and a segment map are generated. If the neural net is for instance trained for five object classes (e.g. cars, traffic signs, human beings, street markings street borders), then five feature score maps are generated.

The scores in one feature score map represent for one object class the fully convolutional network is trained for representing the likelihood that an object of this object class, the fully convolutional network is trained for is represented in the input image matrix. Thus, the objects represented in an input image matrix are "recognized" and a feature score map is generated for each object class wherein for each (down-sampled) pixel a score is formed that indicates the likelihood that a pixel represents an object of the object class. The scores correspond to activations levels of elements of the feature score map. The scores of the elements of the features score maps can be compared with each other in order to assign each element or pixel, respectively to one of the known object classes. Thus, a segment map can be generated wherein the elements are labeled with labels indicating to which of all the objects the segmenting neural network is trained for an individual pixel may belong to.

If, for instance, the neural network is trained for five objects, five feature score maps are generated. By means of a Softmax function, the scores in each feature score map can be normalized on a scale between 0 and 1; cf. https://www.deeplearningbook.org/contents/mlp.html, Eq. 6.29. The normalized scores for corresponding elements of the feature score maps can be compared and the element can be assigned to that object class that corresponds to the score map having the highest score for the respective element. This is done by means of a maximum likelihood estimator using an Argmax function; cf. https://www.deeplearningbook.org/contents/ml.html, Eq. 5.56. Thus, as segment map can be generated from the feature score maps by way of comparing the scores for corresponding elements in the feature score maps.

The score for each element of a feature score map for a respective object class represents an activation level of that element. The higher the activation level—and thus, the higher the score—the higher would be the chance that the element of the score map corresponds to an pixel (or a number of pixels) of the input image pixel matrix that belongs to the respective object, e.g. is a pixel of a car in the image, if the score map is for the object class "car".

The fully convolutional network (FCN) serves as an encoder that can detect objects in an image matrix and produces a low-resolution tensor containing high-level information, i.e. complex features.

The final feature score maps are up-sampled to assign to each pixel of the input pixel matrix a score that indicates the likelihood that a pixel represents an object of a known object class. Such up-sampling can be achieved by means of bilinear interpolation.

Alternatively, up-sampling can be achieved by a decoder.

For semantic segmentation, all architectures are encoder decoder architectures, where down-sampling and up-sampling mean the process of learning simple, more abstract features from pixels in the first convolutional layer, learning complex features from simple features in the next layer, and so on, and learning the same process vice versa in the decoder. The up-sampling by means of bilinear interpolation is done because the size of the feature score maps of the last layer is not necessarily the same as the size of the input image, and—at least in training—the size of the output needs to match the size of the labels which have the same size as the input.

For semantic segmentation, a segment map is generated from the feature score maps. To each element of the segment map a label is assigned that indicates for which of the known object classes the highest activation level is found in the feature score maps.

If the convolutional neural network is not used for semantic segmentation of images but for merely identifying the presence of an object in an image (i.e. simple classification), the output of a final convolutional layer, ReLU-layer or pooling-layer can be fed into a fully connected layer that produces an output vector wherein the values of the vector elements represent a score that indicates the likelihood that a respective object is present in the analyzed image. The output vector of such classifying CNN is thus a feature vector. A neural network for semantic segmentation (further on called segmenting neural network) does not have such fully connected layer because this would destroy the information about the location of objects in the input image matrix.

In any case, the neural network needs to be trained by means of training data sets comprising image data and labels that indicate what is represented by the image data (ground truth). The image data represent the input image matrix and the labels represent the desired output. In a back propagation process, the weights and the filter kernel arrays are iteratively adapted until the difference between the actual output of the CNN and the desired output is minimized. The difference between the actual output of the CNN and the desired output is calculated by means of a loss function.

From a training dataset, containing pairs of an input image and a ground truth image that consists of the correct class labels, the neural network computes the class predictions for each pixel in the output image. In training, a loss function compares the input class labels with the predictions made by the neural network and then pushes the parameters—i.e. the weights in the nodes of the layers—of the neural network in a direction that would have resulted in a better prediction. When this is done again and again with lots of pairs of input images and ground truth images, the neural network will learn the abstract concepts of the given classes.

As indicated above, semantic segmentation results in assigning pixels of an image to known object, i.e. objects, the neural network was trained for. Mere semantic segmentation cannot discriminate between several instances of the same object in an image. If, for instance, in an image several cars are visible, all pixels belonging to a car are assigned to the object "car". The individual cars—i.e. instances of the object "car"—are not discriminated. Discriminating instances of objects of an object class requires instance segmentation.

Pixels that that do not belong to an object that a neural network is trained for will nevertheless be assigned to one of the object classes the neural network was trained for, and the score might even be high. Even with low scores, the object class with the highest relative score would "win", i.e. the pixel will be assigned to the object class with the highest score.

When computer vision and semantic segmentation in particular is used in real life environments, for instance in vehicles to promote autonomous driving, the uncertainty involved in computer vision needs to be taken into account.

Alex Kendall et al. "Bayesian SegNet: Model Uncertainty in Deep Convolutional Encoder-Decoder Architectures for Scene Understanding" 10. October 2016; https://arxiv.org/pdf/1511.02680v2.pdf, present a deep learning framework for probabilistic pixel-wise semantic segmentation and a system which is able to predict pixelwise class labels with a measure of model uncertainty.

It is an object of the invention to provide a system that can assess uncertainty in perception systems.

According to the invention, a perception system is provided that comprises a segmenting neural network and an uncertainty detector.

The segmenting neural network is configured and trained for segmentation of an input image pixel matrix to thus generate a segment composed of elements that correspond the pixels of the input image pixel matrix. By way of class prediction, each element of the segment map is assigned to one of a plurality of object classes the segmenting neural network is trained for by way of class prediction. Elements being assigned to the same object class form a segment of the segment map.

The uncertainty detector is configured to generate an uncertainty score map (also called “uncertainty map”) that is composed of elements that correspond the pixels of the input image pixel matrix. Each element of the uncertainty map has an uncertainty score that is determined by the uncertainty detector and that reflects an amount of uncertainty involved in a class prediction for a corresponding element in the segment map.

Preferably, the uncertainty detector is configured to access feature score maps generated by the segmenting neural network prior to generating the segment map from said feature score maps. The uncertainty detector is configured to determine the amount of uncertainty and thus the uncertainty score for each element of the uncertainty score map by determining a variance of the activation levels of elements of the feature score maps.

Preferably, the uncertainty detector is configured to determine the amount of uncertainty and thus the uncertainty score for each element of the uncertainty score map by determining an inter-sample variance of the activation levels of an element of a feature score map in different samples of the feature score map.

Preferably, the uncertainty detector is configured to generate inter-sample variances of the activation levels an element of a feature score map in different samples of the feature score map by processing an input image pixel matrix with the segmenting neural network in multiple passes while for each pass the segmenting neural network is randomly modified.

Preferably, the random modification of the segmenting neural network includes at least one of dropping nodes from a convolutional layer of the segmenting neural network, altering activation functions in at least some nodes of at least some layers of the segmenting neural net-work and/or introducing noise in at least some nodes of at least some layers of the segmenting neural network.

Preferably, the uncertainty detector is configured to determine an inter-sample variance of the activation levels of corresponding elements of feature score maps that are generated form consecutive image pixel matrices corresponding to frames of a video sequence. In a potential implementation of this embodiment, one pass of determining inter-sample variance from n consecutive images will process images a . . . a+n, and then restart with frames a+n+1 . . . a+2n. To increase the likelihood to not miss a yet unknown object o that appears somewhere within this sequence a . . . a+o . . . a+n, we will run several such passes in parallel, each starting with an offset b, e.g. the second parallel pass at a+b . . . a+b+n, which then restarts at a+b+n+1 . . . a+b+2n. In this second parallel pass, the object o will be closer to the beginning of the pass than in the first parallel pass, and the process will build a better variance with respect to the object o.

Preferably, the uncertainty detector is configured to determine the amount of uncertainty and thus the uncertainty score for each element of the uncertainty score map by determining inter-class variances between activation levels of corresponding elements of feature score maps for different object classes as provided by the segmenting neural network.

Preferably, the uncertainty detector comprises a generative neural network, in particular a variational autoencoder that is trained for the same classes or objects, the segmenting neural network is trained for.

Preferably, the uncertainty detector is configured for

- detecting a region is labeled in the uncertainty score map that are composed of elements having a high uncertainty score and
- labeling the region that is composed of elements having a high uncertainty score as a candidate for representing an object of a yet unknown object class.

High uncertainty score can be an uncertainty scores that are higher than an average uncertainty score of all elements of the uncertainty score map. High uncertainty scores can be uncertainty scores that are higher than a median of the uncertainty scores of all elements of the uncertainty score map. High uncertainty scores can be uncertainty scores that exceed an average uncertainty score or a median of the uncertainty scores of all elements of the uncertainty score map by a predetermined amount.

It is further preferred if the uncertainty detector is configured for

- verifying that the region that is labeled as a candidate for representing an object of a yet unknown object class indeed represents an object of a yet unknown object class by determining the plausibility that a segment of the input image pixel matrix corresponding to the labeled represents an unknown object.

Potential ways for determining such plausibility as disclosed in the section “Preferred ways of checking a plausibility that a segment represents an unknown object” are:

Preferably, the perception system is configured to reconfigure the segmenting neural network by adding a model for a new object class for instance by way of introducing or configuring further layers with weights that represent the new object class, wherein the new object class includes the so far unknown object represented in the segment found to represent a so far unknown object.

Creating a new segmenting neural network that is configured for predicting new object classes (i.e. it incorporates a model for a new object class, sad model being created by training of the neural network) or reconfiguring the existing segmenting neural network so as to enable the existing segmenting neural network to predict objects of an additional new object class can be part of a domain adaptation that extends an operation domain of the perception system.

Reconfiguring the existing segmenting neural network preferably includes the training of the segmenting neural network with input image pixel matrices representing the so far unknown object in combination with a label for the then new object class (ground truth for the so far unknown and then new object class).

Preferably, the existing segmenting neural network or preferably a second, similar companion neural network is trained with the newly determined yet unknown object class, either in the cloud by uploading the newly detected object class and after training downloading the trained neural network or trained similar companion neural network, for instance right on the perception system on an autonomous vehicle.

The newly detected object class can for instance be directly shared with other autonomous vehicles, so each vehicle can train their segmenting neural network or similar companion neural network on a larger number of yet unknown object classes without having to depend on an update from the cloud.

Such training over multiple autonomous vehicles can be parallelized by means of implementing a distributed data parallel training (as explained in: PyTorch Distributed: Experiences on Accelerating Data Parallel Training, https://arxiv.org/pdf/2006.15704.pd). Any such training will preferably be conducted by means of few-shot learning (as explained in: An Overview of Deep Learning Architectures in Few-Shot Learning Domain https://arxiv.org/pdf/2008.06365.pd).

The assignment of individual yet un-known objects to object classes can be automated by their similarity, preferably determined by means of unsupervised segmentation (as explained in: Unsupervised Learning of Image Segmentation Based on Differentiable Feature Clustering, https://arxiv.org/pdf/2007.09990.pdf).

A newly created model for a new object class can be associated automatically to already existing models for known object classes by similarity, by way of determining the similarity by means of one-shot Learning (as explained in: Fully Convolutional One-Shot Object Segmentation for Industrial Robotics, https://arxiv.org/pdf/1903.00683.pdf), in One-Shot-Learning, the elements of the abstract feature vector of the neural network which conducts the One-Shot Learning have a semantic structure, e.g. the feature vector might consist of textual descriptions of the objects, in which e.g. the description of a rickshaw would be similar to the description of a car, and thus, the newly determined object class for a rickshaw can be treated as car-like by the autonomous vehicle without the need of manual association).

According to the invention, a method for semantic segmentation of input image pixel matrices by way of class prediction performed by a segmenting neural network and for determining an amount of uncertainty involved in the class predictions for each pixel of an input image pixel matrix is provided. The method comprises

- segmenting an input image pixel matrix by means of a segmenting neural network that is trained for a plurality of object classes and that generates for each object class a feature score map and therefrom a segment map for the input image pixel matrix by assigning elements of the segment map to one of a plurality of object classes the segmenting neural network is trained for by way of class prediction, elements being assigned to the same object class forming a segment of the segment map and
- generating an uncertainty score map (short: uncertainty map) composed of elements that correspond the pixels of the input image pixel matrix, each element of the uncertainty map having an uncertainty score that is determined by the uncertainty detector and that reflects an amount of uncertainty involved in a class prediction for a corresponding element in the segment map.

Preferably, the method further comprises

- detecting a region in the uncertainty score map that are composed of elements having a high uncertainty score and
- labeling the region that is composed of elements having a high uncertainty score as candidates for representing an object of a yet unknown object class, a high uncertainty score being an uncertainty score that is higher than an average uncertainty score of all elements of the uncertainty score map.

Preferably, the method further comprises

- creating a new object class if a region that is composed of elements having a high uncertainty score is detected, said new object class representing objects as shown in a region of the input image pixel matrix corresponding the region in the uncertainty score map that are composed of elements having a high uncertainty score.

A region that is composed of elements having a high uncertainty score can correspond to a part of a segment of the segment map. For instance, if a part of an input image pixel matrix represents a yet unknown object, the pixel of this part will be assigned to a known object class by the segmenting neural network. However, the pixel representing the un-known object (that does not correspond to any of the object classes the segmenting neural network was trained for) will typically exhibit a higher uncertainty score and thus the yet unknown object can be found by means of the uncertainty score map.

Preferably, the uncertainty score is determined by determining an inter-class variance of the activation levels of elements of the feature score maps for different object classes.

Preferably, the uncertainty score is determined by determining an inter-sample variance of the activation levels of elements of different samples of a feature score map for one object class.

A further aspect of the invention is the use of the method and its embodiments as illustrated herein an autonomous vehicle.

Accordingly, a system for detection and management of uncertainty in perception systems is provided, that comprises a data processing unit implementing a segmentation machine comprising a trained segmenting neural network for semantic segmentation of input image matrices. The neural network comprises convolutional layers and is configured to perform a semantic segmentation of an input image pixel matrix. The semantic segmentation is based on multiple object classes the neural network is trained for.

The system further comprises an uncertainty detector that is configured to determine an uncertainty score for each pixel, a group of pixels or a segment. The uncertainty score reflects how (un-) certain it is that a pixel of a segment represents the object the segment is assigned to by the segmenting neural network. A low level of certainty (i.e. a high level of uncertainty) can mean that pixel of a segment—and thus the segment—are wrongly assigned to an object. The reason may be that the segment represents an object (i.e. of a yet unknown object class) the neural network of the segmentation machine was not trained for, i.e. an unknown object or object class, respectively.

The uncertainty detector can be configured to generate an uncertainty score map wherein for each pixel of the segment map (and thus, typically, for each pixel of the input image pixel matrix) an uncertainty score value is assigned. Preferably, the dimension of the uncertainty score map matches the dimension of the segment map generated by the segmenting neural network. Then, each element of the uncertainty score map directly corresponds to an element of the segment map and—preferably—also to one pixel of the input image pixel matrix.

The uncertainty detector is connected to the segmenting neural network for semantic segmentation of input image matrices.

Thus, the system comprises a segmenting neural network that generates a segment map for each input image pixel matrix and an uncertainty detector that generates an uncertainty score for each pixel of an input image pixel matrix and/or for each element of the segment map.

In alternative embodiments, the uncertainty detector can be configured to determine uncertainty from the feature score maps provided by the segmenting neural network for different object classes by way of analyzing the inter-class variance of the activation levels (feature scores) of the pixels of a segment. In particular, the uncertainty detector can be configured to determine a softmax confidence.

can be configured to cause variations in varying nodes of the layers of the segmenting neural network. The variations can be achieved by randomly dropping out nodes (Monte Carlo drop out) or by randomly modifying the activation functions of some nodes. An input image pixel matrix is processed by the segmenting neural network multiple times and each time the segmenting neural network is randomly modified thus providing varying feature score maps. Thus, a number of varying samples of the feature score map are generated. The inter sample variations of the feature score map samples depend on the influence of the variation of the nodes on the scores in the score maps. Processing an input image pixel matrix multiple times with the segmenting neural network while randomly modifying the segmenting neural network renders the segmenting neural network into a Bayesian neural network implementing variational inference. Preferably, instead of processing the same input image pixel matrix multiple times, multiple frames of a video sequences can be used as input image pixel matrices. Each frame of a video sequence is an input image pixel matrix. If the frame rate of the video sequence is sufficiently high, the inter-frame variations (i.e. the variations from frame to frame) are sufficiently small because the recorded image does not change too much between the frames. For the processing of each individual frame (i.e. each individual image pixel matrix of the video sequence) the segmenting neural network is randomly modified.

can comprise a generative neural network, in particular a variational autoencoder that is trained for the same classes or objects, the segmenting neural network is trained for.

The system is further configured to:

use the segmenting neural network to generate samples of semantically segmented image pixel matrices generate inter-frame variances from a sensor data stream consisting of frames—i.e. mapping corresponding pixels of consecutive frames and taking each consecutive frame as a sample instead of sampling each frame multiple times analyze inter-class and/or inter-frame variances in the per pixel activation levels with respect to individual object classes the neural segmenting network was trained for—i.e. analyze the per pixel scores for the individual object classes.

determine uncertainty scores by assessing a level or amount of uncertainty based on the analysis of the inter-class and/or inter-frame variances in the per pixel activation levels in the semantically segmented image pixel matrix; and to identify segments showing unknown objects from determined uncertainty.

It is preferred if the system is configured to use more than one source of uncertainty at the same time, e.g. the inter-class uncertainty and the inter-frame uncertainty, and to merge these uncertainties, e.g. by means of a weighted sum where the weights depend on the number of samples already taken. For instance, using the first 2 or 3 frames for determining inter-frame variance might not yield a really good result yet, so for steps 1 . . . m in the sequence, only the inter-class variance might be used, and for frames m+1 . . . n, the weight on the inter-frame variance can be increased and the weight in the inter-class variance for the weighted sum of both can be decreased. Instead of a weighted sum, a Bayesian filter can be used, e.g. a particle filter to merge these uncertainties, and instead of a weight, a confidence score in the uncertainty scores for each of both types of uncertainties (inter-class uncertainty and inter-frame uncertainty) can be provided, and the Bayesian filter would yield a confidence score in the resulting uncertainty.

Preferably, the system further is configured to discriminate different unknown objects through analyzing uncertainty.

In a preferred embodiment, the system further is configured to create new object classes based on analysis of uncertainty of pixels in segments that are determined as to show unknown objects.

The segmenting neural network preferably is a fully convolutional network (FCN).

The uncertainty can be aleatoric or epistemic (systemic). Aleatoric uncertainty arises from statistical variations in the environment. Aleatoric uncertainty often occurs at the border of segments in a segment map. Epistemic uncertainty (also known as systemic uncertainty) results from a mismatch in a model (for instance a model as implemented by a neural network) for instance because the neural network is not trained for a specific object class that occurs in the environment; cf. Kendall and Gal, https://arxiv.org/abs/1703.04977.

Uncertainty can be determined and quantified by analyzing the amount of variance of activation levels (i.e. scores in the feature score maps) over multiple samples of the feature score maps that are generated by the segmenting neural network form one input image pixel matrix or a number of similar input image pixel matrices. For each segmentation (i.e. each pass) the segmenting neural network is modified to create variance in the segmenting neural network so the segmenting neural network becomes a Bayesian neural network that implements variational inference. In a Bayesian neural network the input image matrix is processed in a plurality of passes wherein for each pass some nodes of the CNN are dropped out. This technique is known as variational inference. Due to the dropping of nodes in some passes, the activation levels vary from pass to pass. The higher this variance of the score (i.e. activation levels) in the feature score map is, the higher is the uncertainty. Alternatively, a Gaussian Noise can be applied to the signals at the input nodes, the weights, or the activation functions, for variational inference, see the thesis of Yarin Gal, http://mlg.enQ.cam.ac.uk/varin/thesis/thesis.pdf.

Variance of activation levels can also arise from using a sequence of pictures of the same scene taken from different locations or at different points of time. Such sequence can be frames of a video sequence recorded by a video camera of a moving vehicle.

If the neural network is not a Bayesian neural network, uncertainty can be determined by determining the amount of variance or a pattern of variance of the activation levels.

Uncertainty can also be determined via a reconstruction error of a generative neural network.

Unknown objects (i.e. objects the neural network is not trained for or the neural network does not recognize) lead to a high level of uncertainty.

Accordingly, if unknown objects are represented by pixels of an input image pixel matrix, these pixels and thus the unknown objects represented by these pixels can be "found" by determining the uncertainty. This can be used to assign segments of the input image pixel matrix to unknown objects and even further to discriminate between different unknown objects in such segment of the input image pixel matrix.

In the following, by level or "amount of uncertainty of a pixel" a degree of uncertainty is meant that is determined by analyzing the variance of the activation levels (i.e. scores) of the elements of the score maps for the object classes. The elements (i.e. each single element) of the feature score maps (arrays) for the object classes each relate to one or more pixel of the input image matrix. Accordingly, the amount of uncertainty—and thus the uncertainty scores—that can be determined from the activation levels (i.e. scores) of the elements of the score maps also is the amount of uncertainty of the image pixel(s) that correspond to the respective elements of the score maps.

Preferred Ways of Determination of Uncertainty are:

The uncertainty scores can be determined based on the amount of the variance or of a pattern of the variance, or of the kind of variance (i.e. epistemic or aleatoric) or on the temporal variation of the variance of the activation levels (i.e. scores of the feature score maps) or of a combination of these parameters.

The uncertainty determined from the activation levels can be mapped on the input image pixel matrix according to the size of the inputs or the size of the segment map. This means that the size of the uncertainty score map holding the uncertainty scores is the same as the size of the feature score maps/segment map and must be scaled up to the size of the segment map, like the feature score maps must be scaled up to the size of the input image pixel matrix, by means of bilinear interpolation.

The existence of a segment that represents an unknown object can be determined based on the distribution of the amount of uncertainty (i.e. the distribution of the uncertainty scores in the uncertainty score map) assigned to pixels of the input image matrix wherein the amount of uncertainty (i.e. the uncertainty score of each element/pixel) is determined based on the variance of the activation levels of elements of the feature score maps that relate to the pixels of the input image matrix.

An image segment representing an unknown object can be determined by determining a cluster of pixels with a high uncertainty score (i.e. for which a high amount of uncertainty is found) or by determining contiguous pixels having a similar amount of uncertainty (and thus a similar uncertainty score). The amount of uncertainty and thus the uncertainty score of a pixel is determined by determining the variance of the activation levels of those elements of the feature score maps that corresponds to the pixel in the input image pixel matrix.

The size of a segment representing an unknown object can be determined from the size of a cluster of pixels with a high uncertainty score or by the length of the outline of a field of contiguous pixels having a similar uncertainty score.

The position of a segment representing an unknown object can be determined from the position of a cluster of pixels having a high uncertainty score or by determining the position of the outline of contiguous pixels exhibiting a similar uncertainty score.

The relative movement of a segment representing an unknown object can be determined from the temporal change of the position of a cluster of pixels having a high uncertainty score or of the position of an outline of contiguous pixels exhibiting a similar uncertainty score.

The relative distance between a camera generating the input pixel matrix and an unknown object represented a segment can be determined from the temporal change of the variance of the level of activations. Thus, a 3D position of the unknown object from a sequence of 2D input image pixel matrices can be computed.

Preferred Ways of Checking a Plausibility that a Segment Represents an Unknown Object Since the segmenting neural network will assign every pixel to a known object class. pixel that represent a yet unknown object can be determined by means of analyzing uncertainty.

Ways to make it plausible that a segment of the input image matrix represents an unknown object—and thus ways to find a plausible confirmation that segments of pixels with a high amount of uncertainty represent an unknown object are:

The plausibility of a segment representing an unknown object can be derived from the determined outline of the segment and its correlation with the segment prediction, i.e. the semantic segmentation, produced by the neural network. If an entire segment is comprised of pixels with a high uncertainty score (i.e. the majority of pixels within a segment outline) it is likely that the segment represents an unknown object.

The plausibility of a segment representing an unknown object can be determined from the detected outline of the segment and its correlation with an alternative segmentation of the input image matrix, for instance by means of an auto-encoder.

The plausibility of a segment representing an unknown object can be determined from the temporal variation of the variance of the activation levels.

Plausibility of a segment representing an unknown object can be determined by means of a comparison of that segment with another segment representing an unknown object found by a coexisting, redundant subsystem for semantic segmentation.

Plausibility of a segment representing an unknown object can be determined based on a comparison with another segment representing an unknown object found by a different system for semantic segmentation that uses an input image matrix representing the same scenery taken from a different perspective. Such comparison includes a transformation of the two segments representing an unknown object in a common, e.g. global coordinate system.

The invention shall now be further illustrated by way of examples with reference to the figures. In the figures FIG. 1: is a schematic overview of a perception system providing output for other systems, e.g. a sensor fusion system;

FIG. 2: is schematic representation a neural network suitable for semantic segmentation FIG. 3: is a schematic illustration of how an object class is assigned to a pixel of the input image pixel matrix depending on the scores in the score maps of the respective object classes FIG. 4: is a schematic overview of a data processing unit fort use in a perception system according to Figure including an uncertainty detector according to the invention;

FIG. 5 illustrates training of a neural network based on input data sets comprising images and labels (i.e. desired output, ground truth);

FIG. 6: illustrates prediction of a neural network based on an input data set;

FIG. 7: shows an image as represented by an input data set for the semantic segmentation neural network;

FIG. 8: shows the prediction, i.e. the semantic segmentation provided by the neural network for the image if FIG. 5;

FIG. 9: shows regions and segments wherein the pixels have a high amount of uncertainty for the image of FIG. 5;

FIG. 10: is a schematic illustration of a system comprising a perception subsystem, a planning subsystem and a control subsystem;

FIG. 11: illustrates an unknown object plausibility check based on two independent perception subsystems of one vehicle;

FIG. 12: illustrates an unknown object plausibility check based on two independent perception subsystems of two vehicles;

FIG. 13: shows the correlation of the shape of uncertainty with an unknown object;

FIG. 14: illustrates the determination of a segment with an unknown object;

FIG. 15: illustrates sourcing of a domain adaptation dataset;

FIG. 16: illustrates uploading and integration of a domain adaptation dataset;

FIG. 17: illustrates the determination of classes of unknown objects;

FIG. 18: illustrates training of a neural network with a domain adaptation dataset to generate a new model that can process new object classes;

FIG. 19: illustrates training and download of a model for a neural network.

FIG. 20: illustrates transfer learning from a segmenting neural network with an un-known structure;

FIG. 21: illustrates the training of a variational autoencoder;

FIG. 22: illustrates uncertainty detection by means of variational autoencoder;

FIG. 23: illustrates one-shot learning of an uncertainty detector; and

FIG. 24 illustrates the use of multiple parallel redundant uncertainty detectors.

A perception system 10 as shown in FIG. 1 comprises a camera 12 that records images by means of an image sensor (not shown). The recorded images can be still images or sequences of images that form frames of a video stream. The input data stream can also be from a LiDAR (stream of 3D point clouds) or from a radar.

The camera 12 generates an image pixel matrix that is fed to a data processing unit 14. The data processing unit 14 implements a segmenting neural network 40 (see FIGS. 2 and 3) for semantic segmentation of images.

The perception system can be integrated in various devices or machines, in particular in vehicles, for instance autonomous vehicles, e.g. cars.

One aspect is an integration of a perception system with an autonomous vehicle. In such autonomous vehicle, the system that implements the segmenting neural network is perception system 10. The output of the perception system 10 is provided to a sensor fusion system 24.

The neural network as implemented by the data processing unit 14 is defined by a structure of layers comprising nodes and connections between the nodes. In particular, the neural network comprises an encoder part formed by convolution layers and pooling layers. The convolutional layers generate output arrays that are called feature maps. The elements of these feature maps (i.e. arrays) represent activation levels that correspond to certain features in the input image pixel matrix. Features generated by one layer are fed to a next convolutional layer generating a further feature map corresponding to more complex features. Eventually, the activation levels of a feature map correspond the objects belonging to a class of an object the neural network was trained for.

The effect of the convolution in the convolutional layers is achieved by convoluting the input array with filter kernel arrays having elements that represents weights that are applied in the process of convolution. These weights are generated during training of the neural network for one or more specific object classes.

Training of the neural network is done by means of training data sets comprising image data (input image pixel matrix 66, see FIG. 5) and labels 68 that indicate what is represented by the image data (ground truth). The image data represent the input image matrix 66 and the labels 68 represent the desired output. In a back propagation process, the weights and the filter kernel arrays are iteratively adapted until the difference between the actual output of the CNN and the desired output is minimized. The difference between the actual output (segment map 72) of the CNN and the desired output (labeled input image matrix 66) is calculated by means of a loss function 70.

From a training dataset, containing pairs of an input image and a ground truth image that consists of the correct class labels, the neural network 40 computes the class predictions for each pixel in the output image, i.e. the segment map 72. In training, a loss function 68 compares the input class labels 68 with the predictions (i.e. the labels 68' in the segment map 72) made by the neural network 40 and then pushes the parameters—i.e. the weights in the nodes of the layers—of the neural network in a direction that would have resulted in a better prediction. When this is done again and again with lots of pairs of input images and ground truth images, the neural network will learn the abstract concepts of the given classes; cf. FIG. 5.

A trained neural network is thus defined by its topology of layers (i.e. the structure of the neural network), by the activation functions of the neural network's nodes and by the weights of the filter kernel arrays and potential the weights in summing up nodes of layers such as fully connected layers (fully connected layers are used in classifiers)

The topology and the activation functions of a neural network—and thus the structure of a neural network—is defined by a structure data set.

The weights that represent the specific model a neural network is trained for are stored in a model data set. Of course, the model data set must fit the structure of the neural network as defined by the structure data set. At least the model data, in particular the weights determined during training, are stored in a file that is called "checkpoint".

The model data set and the structure data set are stored in a memory 16 that is part of or is accessible by the data processing unit 14.

The data processing unit 14 is further connected to a data communication interface 18 for exchanging data that control the behavior of the neural network, e.g. model data as stored in a model data set or training data as stored in a training data set used for training the neural network.

For visualizing a segmentation provided by the neural network, a display unit 20 may be connected to the data processing unit 14. However, in an autonomous vehicle, the segmentation will not be shown on a display unit but post-processed into an object list and then provided as input to a sensor fusion system, e.g. a Kalman filter.

Information of the absence or presence and—if present—the position of an image representation of an object in the input image pixel matrix can be derived from the segmented input image pixel matrix. This information can be encoded in data and can be used for control or planning purposes of further system components. Accordingly, an output data interface 22 is provided that is configured to pass on data indicating the absence or presence and the position of a recognized object in the input image pixel matrix. To the output data interface 22, a sensor fusion system 24 can be connected. The sensor fusion system 24 typically is connected to further perception systems not shown in the figure.

The sensor fusion system 24 receives input from various perception systems 10, each within or associated with one particular sensor such as a camera, a radar or a LiDAR. The sensor fusion system 24 is implemented by a Bayesian filter, e.g. an extended Kalman filter, which processes the inputs of the perception systems 10 as measurements. For the extended Kalman filter, these inputs are not the segment maps, but post-processed object lists, derived from the segment maps. The extended Kalman filter will associate each measurement with a measurement uncertainty value, which is usually configured statically, e.g. a sensor uncertainty value, configured according to a model of the particular sensor. In the extended Kalman filter, multiple sources of such uncertainty for a measurement are added and normalized. Here, the uncertainty scores generated by the uncertainty detector 60 (see FIG. 4) can be easily integrated by adding a model uncertainty to the measurements. This is how an uncertainty detector can be integrated with an autonomous vehicle.

Image Segmentation

The trained segmenting neural network 40 has an encoder—decoder structure a schematically shown in FIG. 2. The encoder part 42 is a fully convolutional network (FCN), for example a ResNet 101. Alternative implementations could be VGG-16 or VGG-19.

The decoder part 44 can be implemented as a DeepLab aspp (atrous spatial pyramid pooling).

The segmenting neural network 40 is a fully convolutional network composed of convolutional layers 46, pooling layers 48, feature maps 50, score maps 52 (i.e. up-sampled feature maps) and one segment map 54.

In the example in FIG. 2, the segmenting neural network 40 is configured and trained for three object classes. Accordingly, on each level, three convolutional layer 46 are provided that each generate a feature map for one object class. Each convolutional layer implements ReLU activation functions in the nodes. Pooling layers 48 reduce the size if the feature map to thus generate an input for a next convolutional layer 46. Feature maps 50 of the trained segmenting neural network each reflect the likelihood that an object of one object class is represented by according elements of the input image pixel matrix. Typically, the feature maps have a smaller dimension than the input image pixel matrix. In the decoder part 44 of the segmenting neural network the feature maps are up-sampled and up-sampled feature maps 52 (herein also called score maps) are generated wherein the elements have score values that reflect the likelihood that a certain pixel represents an object of the object class the segmenting neural network was trained for. For segmenting the input image pixel matrix each element (i.e. each pixel) is assigned to one of the object classes the segmenting neural network was trained for. This can be done by using the argmax function (a maximum likelihood estimator), that compares the scores of corresponding elements in the feature score maps for each object class. A pixel is assigned to that object class showing the highest score for that pixel or element, respectively. Thus, one segment map 54 is generated from three feature score maps 52.

According to a preferred embodiment, the ReLU activation function applied is a customized ReLU function that allows introducing random dropping of nodes so the segmenting neural network 40 can act as Bayesian neural network.

FIG. 3 illustrates that the feature maps 50 and 52 for each object class A, B or C are acting in parallel (and not in series as FIG. 2 might suggest). If, for instance, the neural network is trained for three objects, three score maps are generated. By means of a SoftMax function, the scores in each feature score map are normalized on a scale between 0 and 1. The normalized scores for corresponding elements of the feature maps can be compared and the element can be assigned to that object class that corresponds to the feature score map having the highest score for the respective element. This is done by means of a maximum likelihood estimator using an argmax function.

In FIG. 3, segment 56 is a segment, where the activation levels of the array elements are higher than the activation levels of corresponding array elements of the score maps for object classes A and B. Segment 58 is a segment, where the activation levels of the array elements are higher than the activation levels of corresponding array elements of the score maps for object classes B and C. Please note that each pixel in the segment map 54 is assigned to one object class of all the object classes the segmenting neural network 40 is trained for. Accordingly, there are no non-assigned elements or pixels. FIG. 3 might be misleading in that respect because FIG. 3 does not show that all pixels are assigned to a known object class and thus are part of a segment FIG. 6 illustrates the generation of a segment map 72 from an input image 66 by means of a prediction performed by the segmenting neural network 40.

The segmenting neural network 40 is part of the data processing unit 14.

FIGS. 7 and 8 illustrate that all pixels in an input image are assigned to known objects. In case the input image 66'—and thus the input image pixel matrix 66'—comprises unknown objects like boxes 90 on the street, these unknown objects 90 are assigned to known objects Such as Street Markings 92.

Uncertainty Detection

For planning and control purposes, it is helpful to have an indication regarding the reliability of the data provided by the output data interface 22.

Therefore, it is an object to determine a level (or amount) of uncertainty involved in the data, i.e. in the semantic image segmentation as provided by the neural network.

It is a further object to recognize image segments or parts of image segments that cannot reliably assigned to an object. According to one concept of the invention image regions that cannot reliably assigned to an object can be recognized by way of determined uncertainty. Uncertainty means model uncertainty from Bayesian statistics; cf. Kendall and Gal, https://arxiv.org/abs/1703.04977, and in one of their sources, https://www.repository.cam.ac.uk/bitstream/handle/810/

248538/Ghahramani%202015%20Nature.pdf; jsessionid=0492F830B1 DAA2A6A1AE004766B0E064?sequence=1.

In a first step, uncertainty scores on the level of pixels (per pixel) of the input image pixel matrix are created or generated. This can be achieved by provoking or determining forms of variance in the activation levels (scores) of the individual pixels with respect to the object classes.

The activation levels (i.e. the score) of the elements in the feature score maps for the individual object classes the neural network is trained for may vary, if frames of a video sequence are regarded or if the semantic segmentation is repetitively performed in multiple passes where varying nodes are dropped. The variance can be temporal—i.e. between different passes or between different frames of a video sequence—or spatial, i.e. within an image pixel matrix, for instance at the edges of segments.

The variance can be achieved by setting the activation to zero with a random probability. A dropout operation is inserted into the layers to which dropout shall be applied, so the inner architecture of the layer looks like convolution/dropout/non-linearity.

Specifically, amounts of uncertainty can be determined and quantified by analyzing the amount of variance of activation levels (i.e. scores in the feature score maps) over multiple samples. In a Bayesian neural network (i.e. for instance a convolutional neural network that is randomly modified, e.g. by randomly dropping nodes) the input image matrix is processed in a plurality of passes wherein for each pass some nodes of the convolutional neural network are dropped out. This technique is known as variational inference. Due to the dropping of nodes in some passes, the activation levels vary from pass to pass resulting in an inter-sample per pixel variance. The higher thus variance is, the higher is the amount of uncertainty and thus the uncertainty score.

Inter sample variance of activation levels can also arise from using a sequence of pictures of the same scene taken at different points of time. Such sequence can be frame of a video sequence recorded by a video camera of a moving vehicle.

If the neural network is not a Bayesian neural network, per pixel uncertainty can be determined by determining the amount of inter-class variance or a pattern of variance of the activation levels (spatial variance).

Uncertainty can also be determined via a reconstruction error of a generative neural net-work, for instance by means of a variational autoencoder.

Unknown objects (i.e. objects the neural network is not trained for or the neural network does not recognize) lead to a high level of uncertainty and thus to high uncertainty scores of the pixel of a segment representing an unknown object.

The uncertainty map represents the uncertainty score for each pixel. The uncertainty map is created by analyzing the activation levels of the matrix elements (corresponding to the image pixels) in the feature score maps for the different object classes, the segmenting neural network is trained for. The uncertainty score map can be created from analyzing the variance of the activation levels over a plurality of passes when applying i.e. Monte Carlo drop out to the segmenting neural network to thus cause variance between the samples generated with each pass (inter-sample variance). For tracking the variance over the passes and generating an uncertainty map, a uncertainty detector may be provided.

Accordingly, if unknown objects are represented by pixels of an input image pixel matrix, these pixels and thus the unknown objects represented by these pixels can be "found" by determining the uncertainty scores. This can be used to assign segments of the input image pixel matrix to unknown objects and even further to discriminate between different unknown objects in such segment of the input image pixel matrix.

The basic steps the system according to the invention performs are:

using a segmenting neural network to generate samples of semantically segmented image pixel matrices analyze inter-class and/or inter-frame variances in the per pixel activation levels with respect to individual object classes the neural network was trained for—i.e. analyze the per pixels scores for the individual object classes.

determining uncertainty by assessing a level or amount of uncertainty based on the analysis of the inter-class and/or inter-frame variances in the per pixel activation levels in the semantically segmented image pixel matrix; and identify segments showing unknown objects from determined uncertainty Preferably, the system further discriminates different unknown objects through analyzing uncertainty and optionally creates new object classes based on analysis of uncertainty of pixels in segments that are determined as to show unknown objects.

For performing uncertainty detection the data processing unit 14 comprises an uncertainty detector 60, see FIG. 4.

The uncertainty detector 60 can be configured to determine uncertainty from the feature score map 52 provided by the segmenting neural network 40 by way of analyzing the interclass variance of the values of the activation levels before the maximum likelihood estimator, i.e. before the argmax functions is applied and the segment map 54 is generated. Before the maximum likelihood estimator, i.e. before the argmax functions is applied and the segment map 54 is generated, each pixel has activations levels for each known class. By way of the argmax function, the pixel typically is assigned to the class with the highest activation level. Prior to applying the argmax functions interclass variances for each pixel can be determined.

Alternatively or additionally, the uncertainty detector 60 can comprise a generative neural network 62 implementing a generative model that is based on the same training dataset as the segmenting neural network 40 to reproduce the input image. The generative neural network 62 preferably is a variational autoencoder. The per pixel reconstruction loss between the input image and the image reconstructed by the generative neural network 62 corresponds to the uncertainty. A higher reconstruction loss reflects a higher amount of uncertainty.

Preferably, the uncertainty detector 60 is configured to implement a Bayesian neural net-work as means for generating inter-sample variance and thus an uncertainty score. In this embodiment, the uncertainty detector 60 is preferably configured to apply is a customized ReLU function that allows introducing random dropping of nodes so the segmenting neural network 40 can act as Bayesian neural network. Uncertainty can thus be determined by means of repeating the prediction several times (sampling) under variation of the segmenting neural network 40 (e.g. dropout of nodes) or insertion of noise into the weights or activation functions. The activation levels in the score maps (after the softmax function but before the maximum likelihood estimator (argmax)) over all the samples will then have a high inter-sample variance for the parts of the input which do not correspond to the training data and a low variance for the parts of the input which correspond well to the training data. A tensor library 64 comprises the customized ReLU used for rendering the segmenting neural network 40 into a Bayesian neural network.

When in use, the data processing unit 14 receives input image pixel matrices 66 as an input. The data processing unit 14 generates a segment map 72 and an uncertainty score map 74 as outputs.

FIG. 9 illustrates an uncertainty score map 74 generated from the input image shown in FIG. 7. FIG. 8 illustrates the segment map generated from the input picture shown in FIG. 7. As can be taken from FIG. 9, the unknown objects 90 (i.e. boxes on the street) are represented by segments wherein the pixel exhibit a high amount of uncertainty—and thus bear a high uncertainty score, reflected by a lighter color in FIG. 9. In the segment map 74 as shown in FIG. 8 the pixels that represent the unknown objects (boxes on the street) are assigned to various known objects. While this is correct in terms of the function of the segmenting neural network, from a user's perspective the segmenting result is wrong as far as the unknown objects are concerned. Such "wrong" assignment can be detected by means of the uncertainty score of the pixels in the segments (prior to assigning the pixels to the known object classes, e.g. prior to applying the function for classifying each pixel).

Detailed Description of the Determination of the Amount of Variance

The amount of variance can be determined by provoking and/or analyzing forms of variance in the activation levels (scores) of the individual elements of the feature score maps for the object classes the segmenting neural network is trained for.

The amount of variance can be determined between different samples of a feature score map for one object class, thus determining an inter-sample variance.

The amount of variance can be determined between feature score maps for different object classes, thus determining an inter-class variance.

These approaches can be combined.

Detailed Description of the Determination of the Amount of Uncertainty (Uncertainty Scores)

based on the variance as disclosed above

For corresponding elements of the score maps (i.e. matrix of activation levels for each object class)

The uncertainty detector can be configured to determine prediction uncertainty in various ways. The per-pixel uncertainty scores that indicate prediction uncertainty can for instance determined:

- by means of the values of the activation levels before the maximum likelihood estimator, where the uncertainty detector compares the relative activation levels of respective pixels in the feature score maps, e.g. by means of class agnostic threshold on the activation levels, by means of class specific thresholds on the activation levels, or by respective thresholds on the difference between the activation levels of classes, e.g. the top-2 activation levels, where a higher difference would indicate lower uncertainty and vice versa.
- by means of training a generative model on the same training dataset, e.g. a variational autoencoder to reproduce the input image and take advantage of the fact that the variational autoencoder will fail to reproduce unknown object classes. By means of computing the reconstruction loss in prediction mode as one would do in training mode, a pixel-wise (per pixel) uncertainty score is determined, where a higher reconstruction loss would indicate higher uncertainty.
- by means of implementing a Bayesian neural network by variational inference, e.g. realized by the application of Monte Carlo dropout in training mode and in prediction mode of the segmenting neural network in combination with sampling in prediction mode of the segmenting neural network, where the uncertainty detector takes advantage of the fact that unknown object classes (i.e. unknown objects in the input image pixel matrix) will result in higher pixel-wise inter-sample variance between the samples, and higher variance would indicate higher uncertainty and vice versa, or. e.g. realized by the application of Gaussian noise to the values of the weights or the activation functions with the same effect as Monte Carlo dropout.

Detailed Description as how to Assign an Amount of Uncertainty (Uncertainty Level) to Each Pixel of the Input Image Pixel Matrix The uncertainty detector can take e.g. the values of the pixel-wise activation levels in the feature score maps, the reconstruction loss values of the pixel-wise reconstruction loss of a variational autoencoder, or the values of the pixel-wise variance in variational inference or a combination of these for determining uncertainty scores for the elements of the uncertainty score map. Lower activation levels indicate higher uncertainty scores. A lower difference between the activation levels of the top-2 classes or a higher variance over all object classes indicates higher uncertainty scores. A higher variance between the samples in variational inference indicates higher uncertainty scores. In the case of variational inference, we have variances per pixel per object class, which the uncertainty detector aggregates into one variance per pixel, e.g. by taking the sum or by taking the mean.

Detailed Description of Determining Segments (of the Input Image Pixel Matrix) that Represent Unknown Objects Based on the Uncertainty Score of Each Pixel Determining segments that represent an object of an unknown object class is done to determine whether the perception system 10 operates within or without its operation domain. The domain is defined by the object classes, the segmenting neural network 40 is trained for.

Determining segments that represent an object of an unknown object class thus is part of an out-of-domain detection. In FIGS. 10 to 13, the out-of-domain detection is simply marked as domain detection. The detection of segments representing objects of a yet un-known, new object class can be used creating models representing the new object class and thus for domain adaptation.

Just like the predictions of the segmenting neural network—i.e. the feature score maps reflecting the activation levels of the elements for each object class and the segment map derived therefrom—, the uncertainty, derived from the variance or the activation levels, is a pixel image, so for each pixel in the segment map exactly one corresponding uncertainty score is found in the uncertainty score map.

If the uncertainty detector comprises a Bayesian neural network as means for detecting inter-sample uncertainty and thus uncertainty scores for the pixels or elements, respectively, aleatoric uncertainty will show at the edges of segments (see FIG. 9, the light colored "frame" around a segment). The origin of aleatoric uncertainty is due to the fact that in the labelling process, the segments in the training dataset have been labelled manually or semi-automatically by humans, who will label the edges of objects sometimes more narrow and sometimes more wide. The neural network will learn this variety of labelling styles, and sometimes predict the edges of segments more narrow and sometimes more wide. This also happens when the samples for variational inference are taken in prediction, leading up to uncertainty at the edges of segments. The uncertainty detector preferably is configured to match the regions in the uncertainty map in which aleatoric uncertainty occurs to the edges of the predicted segments in the segment map by means of standard computer vision techniques for edge detection, corner detection, or region detection (aka area detection). Where the aleatoric uncertainty matches the edges of predicted segments, a correct prediction of the segment is indicated. If aleatoric uncertainty is missing at the edge of a predicted segment in the segment map or if aleatoric uncertainty exists within a segment, an incorrect prediction is indicated.

If the uncertainty detector comprises a Bayesian neural network as means for detecting inter-sample uncertainty and thus for generating uncertainty scores for the pixels or elements, respectively, epistemic uncertainty will show inside of segments (see FIG. 9, the light colored segments 90). So will the other approaches for detecting uncertainty show uncertainty inside of segments. Epistemic uncertainty directly indicates an incorrect segment prediction, i.e. an incorrect segmentation in the segment map. The uncertainty detector is configured to determine regions of uncertainty e.g. by means of standard computer vision techniques for edge detection, corner detection, or region detection (aka area detection). Besides the fact, that there is uncertainty indicated by pixels in the uncertainty score map, that these pixels gather at the edges of segments of the segment map or within uncertain segments of the segment map, the uncertainty values of these per pixel uncertainties also vary within segments. This kind of uncertainty may extend into other segments of the segment map and the corresponding regions of the uncertainty score map where the segment predictions have been correct (false positive), or do not entirely fill a segment where the segment predictions have been incorrect (false negative). To capture these false positives and false negatives of the uncertainty scores itself, the uncertainty detector can comprise a small classifying neural network, i.e. a classifier, that is trained with the uncertainty score map in combination with labelled training dataset. For this training, object classes are used that do not belong to the original training domain (as defined by the object classes the segmenting neural network ids originally trained for) of the original segmenting neural network. By means of this classifier, the uncertainty detector optimizes the matching of the determined regions of uncertainty of the uncertainty score map where the elements of the uncertainty score map have high uncertainty scores to the real shapes of the incorrectly predicted segments in the segment map. Thus, the uncertainty score map is segmented in accordance with the segment map. The uncertainty detector plausibilizes the regions determined by this classifier with the regions determined by means of the standard computer vision techniques.

FIG. 14 illustrates the prediction by a neural network and the measurement of prediction uncertainty. From the input image on the left side, the segmenting neural network computes the class predictions for each pixel on the right side and the uncertainty detector computes uncertainty value predictions for each pixel. FIG. 13 shows the correlation of the shape of uncertainty with an unknown object.

The uncertainty detector can be implement in different ways.

For a Bayesian neural network prediction uncertainty can be determined by means of repeating the prediction several times (sampling) under variation of the segmenting neural network (e.g. dropout of nodes) or insertion of noise into the weights or activation functions.

The activation levels in the score maps (after the softmax function but before the maximum likelihood estimator (argmax)) over all the samples will then have a high inter-sample variance for the parts of the input which do not correspond to the training data and a low variance for the parts of the input which correspond well to the training data. This embodiment requires that the uncertainty detector interacts with the segmenting neural network and randomly modifies the segmenting neural network and in particular at least some nodes of the convolutional layers of the segmenting neural network. The uncertainty detector can for instance be configured to modify at least some of the ReLU activation functions of the convolutional layers to thus cause dropping of nodes or to modify values of weights in some nodes.

For neural networks which are not bayesian, the uncertainty values can be determined from only one sample by way of determining the inter-class variance between the softmax scores over the score maps (every pixel has a softmax score in every score map). This inter-class variance can be determined e.g. as the difference between the top-2 softmax scores, i.e. the difference between the largest softmax score and the second largest softmax score, or as the variance between the softmax scores over all object classes. Instead of the variance, a threshold could be applied. This embodiment does not require that the uncertainty detector modifies the segmenting neural network.

As a third alternative embodiment, the uncertainty detector can comprise a generative neural network, e.g. a variational autoencoder, to recreate the input image and measure the uncertainty by exactly the same means as described above or by determining a reconstruction loss. The generative neural network, e.g. a variational autoencoder, implement the same model (i.e. is trained for the same objects or classes) as the segmenting neural network.

Preferably, the uncertainty detector is configured to implement a Bayesian neural network as means for generating inter-sample uncertainty. However, the process of sampling consumes a lot of time as a statistically relevant number of samples is needed for a reliable result. Instead of sampling each instance of the data sequence received from the sensor many times as would be done in the simplest case, the uncertainty detector preferably is configured to compute the inter-sample variance over subsequent instances (for instance subsequent frames of a video sequence), while sampling each instance only one or a few times. If the instances are input image pixel matrices corresponding to frames of a video sequence recorded by a vehicle, this is possible because the pixels of these instances correspond to each other within a variable amount of shift, rotation, and scale due to the movement of the vehicle. The uncertainty detector is configured to match single pixels or regions of pixels of one instance to corresponding pixels or regions of pixels of subsequent instances to determine the inter-sample variance between the feature score values of these pixels.

Regions in an uncertainty score map generated by the uncertainty detector that exhibit elements with a high uncertainty score are candidates for segments that represent an unknown object, i.e. not the object the segment is assigned to in the segment map and thus not an object belonging to an object class the segmenting neural network is trained for.

Detailed Description on Confirming the Plausibility that a Segment Determined as Representing an Unknown Object Indeed Represents an Unknown Object.

The uncertainty detector preferably is configured to further plausibilize a segment determined as representing an unknown object by means of communication with other vehicles in the vicinity of a scene. The uncertainty detector will map the scene to a global coordinate system, which is e.g. the coordinate system of the HD map used by the vehicle for localization. Thus the locations of objects in the global coordinate system are detected that correspond to segments in the segment map corresponding to known or to unknown objects.

If segment maps generated from input image pixel matrixes recorded from different locations are compared, it is possible to compare segments that are candidates for representing an unknown object. Input image pixel matrices from different locations can origin for instance from two different cameras of one vehicle or from the cameras of two different vehicle, see FIGS. 11, 12 and 13.

The uncertainty detector of a first vehicle will send the coordinates of the unknown object to other vehicles in the vicinity of the scene, so another uncertainty detector within a receiving vehicle can match the segment received to the corresponding segment of the first vehicle. A match will increase the probability that the object is indeed of an unknown object class. A missing match will decrease this probability. For the case where the vehicle the uncertainty detector output for initiating a minimal risk maneuver, the uncertainty detector uses this means of plausibilization only if the potential unknown object is sufficiently far away so the entire procedure of vehicle-to-vehicle plausibilization takes no more time than the fault-tolerant-time-interval until it would be too late to initiate the minimal risk maneuver. For the case of recording of the potential unknown object in a dataset for domain adaptation, this means of plausibilization can always be applied. To determine the fault-tolerant-time-interval, the 3D position of the potential unknown object is required, which the uncertainty detector determines e.g. by means of monocular depth estimation, or by inference from motion.

As a second method of vehicle-to-vehicle plausibilization, the uncertainty detector within one vehicle will send information identifying the segment of the unknown object to other vehicles which do not have to be in the vicinity of the scene. The uncertainty detector in the receiving vehicle will patch the received segment into an unrelated scene observed by the other vehicle and compute the uncertainty. If the segment has high uncertainty in the unrelated scene, the uncertainty detector increases a probability value indicating the probability that the object is indeed of an unknown object class. If the identified segment has low uncertainty in the unrelated scene, the uncertainty detector will decrease the probability value reflecting the probability that the object is indeed of an unknown object class and instead assign the object class determined with low uncertainty to the object. In the case where this computation would take too much time, the uncertainty detector will perform this computation only locally within one vehicle, and the unrelated scene will be from an unrelated dataset, allowing for the further plausibilization with respect to the labels provided with this dataset.

Detailed Description of Automatic Generation of New Object Classes Based on the Analysis of Segments Representing Yet Unknown Objects The uncertainty detector preferably will create a dataset of new object classes from the unknown objects identify by the uncertainty detector. The dataset will be comprised of the sensor input data—i.e. an input image pixel matrix, corresponding to the unknown object, together with a matrix of plausibilized uncertain pixels (in case of video input) or points (in case of LiDAR input) as labels, see FIG. 14. However, from all the instances of yet unknown objects together with their labels created by the uncertainty detector, which identify their position but not their real object class yet, a set of real object classes needs to be derived. Preferably, the uncertainty detector is configured to group instances of yet unknown objects into candidate object classes by means of unsupervised segmentation. Preferably, the uncertainty detector is also configured to determine possible candidate object classes by means of one-shot learning where a visual input is mapped to a feature vector where each feature has an intrinsic meaning and an intrinsic relationship to other features, with features being e.g. descriptions in natural language; see FIG. 18.

Detailed Description of a Vehicle Control System Comprising a Video Camera, a Semantic Segmentation System Connected to the Video Camera, a Vehicle-to-Vehicle (V2V) Communication Means Allowing Vehicle-to-Vehicle Communication for Exchanging Object Class Definitions/Representations The identification of yet unknown objects (out-of-domain detection) will be performed by the uncertainty detector on the device, e.g. a sensor where our technology is integrated with the neural network performing a computer vision task. There, the uncertainty detector will record the sensor input data corresponding to the unknown object, together with the matrix of plausibilized uncertain pixels or points as labels. For vehicle-to-vehicle plausibilization, the device implementing the uncertainty detector needs vehicle-to-vehicle connectivity, provided by other in-vehicle systems. The creation of the dataset of new object classes can be performed either by the uncertainty detector on the device or in the cloud. Therefore, the device needs vehicle-to-infrastructure communication, see FIG. 13.

Detailed Description of Domain Adaptation

Domain adaption serves for extending the operation domain of the perception system. Domain adaptation preferably includes out-of-domain detection, for instance by way of identification of objects belonging to a yet unknown object class. Domain adaptation preferably includes an adaptation or creation of a segmenting neural network so objects of one or more new object classes can be predicted by the segmenting neural network.

FIGS. 15 to 19 illustrate domain adaptation and in particular the process of enabling a segmenting neural network to predict objects of a new object class. FIGS. 18 and 19 illustrate a continuous domain adaptation.

Domain adaptation can be performed either by the uncertainty detector on the device or in the cloud, see FIGS. 16 and 17. This can happen by means of various, well-known techniques, in the simplest case by means of re-training the trained segmenting neural network with the newly determined object classes from the dataset of new object classes. In this case, re-training of the segmenting neural network means updating the file containing the values of the weights in a persistent memory. During re-training, this file is updated, and the updated file can loaded by the device, e.g. in the next on-off-cycle of the device. If retraining happens in the cloud, the updated file will be downloaded from the cloud to the persistent memory of the device by the software-update function of the device.

The operational design domain is the domain in which the system and in particular the perception subsystem can operate reliably. The operational design domain is inter alia defined by the object classes the perception subsystem can discriminate.

Domain adaptation means that for instance the perception subsystem is newly configured or updated to be capable of discriminating further object classes that occur in the environment the perception subsystem is used in.

Data configuring the neural network—i.e. data defining the weights and the activation functions of the nodes in the layers and of the filter kernel arrays—define a model that is represented by the neural network. "Downloading a model" thus means downloading configuration data for the neural network so as to define a new model, e.g. a model that is capable to discriminate more object classes Updating a Model with Configuration Data from Another Model When the program instantiates a neural network, this neural network is usually uninitialized. There are then two modes of operation. When the neural network shall be trained, the program will instantiate a neural network model from a software library, and its weights will here be initialized with random values, and the training procedure will gradually adapt the values of these weights. When the training is over, the values of the weights of the neural network will be saved in a file that corresponds to the architecture (structure, topology) of the neural network and to a generic storage file format, depending on the software library used for implementing the neural network, such like TensorFlow (by Google), PyTorch (by Facebook), Apache MXNet (by Microsoft), or the ONNX format (Open Neural Network Exchange). The established term for this file is "checkpoint". The checkpoint file represents the model the neural network is trained for. When the neural network shall then be used for prediction, the program will again instantiate a neural network model from that software library, but for prediction, its weights will not be initialized with random values, but with the stored values for the weights from the checkpoint file. This neural network can then be used for prediction. The checkpoint file comprises always data, which will be loaded by the program on every start of an on-off-cycle of the system.

The checkpoint file comprises data configuring the neural network—i.e. data defining the weights and the activation functions of the nodes in the layers and of the filter kernel arrays-define a model that is represented by the neural network. "Downloading a model" thus means downloading the checkpoint file containing configuration data for the neural network so as to define a new model, e.g. a model that is capable to discriminate more object classes.

When the neural network is adapted, a program instantiates a neural network model, which—this time—is not initialized with random data for training, but with the values of weights from the checkpoint file. Then the training procedure is started with the new domain adaptation dataset. Accordingly, this training does not start from scratch but from a pre-trained state. There are now two modes of adaptation. If the new object classes from the domain adaptation dataset are not similar to the object classes that the segmenting neural network already knows, space has to be provided for new object classes to be learned, which means that the architecture of the neural network must be changed to provide as many additional feature score maps (and hence additional convolutional kernels with their weights) for the last layer as are expected to be necessary to learn the new object classes. In this case, only the weights that were present in the architecture before can be initialized from the checkpoint, and the new convolutional kernels will be initialized with random data. If, on the other hand, the new object classes are so similar to the object classes already known that it can be expected that they will generalize to the object classes already known, there is no need to change the architecture of the neural network. For training, in both cases, the values of the weights of most layers in the neural network would be frozen (i.e. not amended) and only the last few layers would be trained for the adaptation. To update the system with the new segmenting neural network, a new checkpoint file is provided. In most cases, there will be no need for updating the software library because most libraries can instantiate a neural network model in a variable way, e.g. regarding the number of object classes. A software library stores these parameters within the checkpoint file, so there is no change of the program required.

Additional training can be achieved by means of few shot learning (i.e. limited number of training data sets for a new object class).

In another preferred embodiment, a semantic segmentation model is trained with a new object training dataset as input to the semantic segmentation model. The system is configured to feed the output of the semantic segmentation model and the outputs of one or multiple parallel redundant uncertainty detectors as input to a supervisor model that is trained to predict a semantic segmentation with two classes, indicating if an entire segment is considered correctly or incorrectly predicted.

In order to train a Bayesian segmenting neural network 40 with training datasets from a segmenting neural network with an unknown structure by means of transfer learning, a system as shown in FIG. 20 may be provided. The system is configured to determine the loss between a segment map 54A generated by the unknown segmenting neural network from the input image pixel matrix of a training data set and a segment map 54B provided with the training dataset. The segment map 54B provides the labels for the input image matrix as generated by the segmenting neural network that has generated the training dataset. The system shown in FIG. 20 is configured to determine the loss (determined by loss function 76) between the segment map 54A generated by the unknown segmenting neural network and the segment map 54B belonging to the training dataset. A high loss indicates where the labels provided with the training dataset differ from the labels (i.e. segments) generated by the unknown segmenting neural network. Elements or pixel that exhibit a high loss can be assigned to an ignore class to thus avoid that these image parts can influence affect the training of the Bayesian segmenting neural network by way of transfer learning with a training dataset as for instance generated by an autonomous system as disclosed above. In other words, elements assigned to the ignore class by means of loss function 76 will be ignored by the loss function 78 that is used for training the Bayesian segmenting neural network 40.

The Bayesian segmenting neural network 40 can, for instance, be the segmenting neural network of the autonomous device 10' while the unknown trained segmenting neural network can be the segmenting neural network of an autonomous driving system.

FIG. 21 illustrates the training of a variational autoencoder 62', by way of transfer learning with a dataset as input to a (known or unknown) trained segmenting neural network. The dataset is used as input to the variational autoencoder. However, the dataset used as input for the variational autoencoder is modified by computing a loss for the pixels predicted by the trained segmenting neural network and assigning pixels with a high loss to the ignore class when training the variational autoencoder.

In other embodiments, the variational autoencoder 62' may implement a known model of a trained segmenting neural network.

FIG. 22 illustrates uncertainty detection by means of variational autoencoder 62' (as a generative neural network) in order to determine pixels with a high loss due to uncertainty. In case an input dataset (for instance an input image pixel matrix) as input to a trained neural network e.g. for semantic segmentation that comprises an unknown object, the pixels representing the unknown object should exhibit a high uncertainty score. The input dataset 66 is fed as an input to the variational autoencoder 62' and to a loss function 80. The prediction 82 of the variational autoencoder 62' is also fed to the loss function 80 in order to determine the loss between the input image pixel matrix data set 66 that may comprise data representing an unknown object and the prediction 82 (output data set) of the variational autoencoder 62'. Thus, a loss for the pixels predicted by the trained neural network can be computed and an uncertainty score map 74' can be generated accordingly. In FIG. 22, the uncertainty score map 74' comprises a segment with pixels having a high uncertainty score where pixels of the input image pixel matrix 66 represent an unknown object (yellow box on FIG. 22).

For training the variational autoencoder (see FIG. 21) pixels with a high loss can be ignored. In a preferred embodiment, the variational autoencoder used for determining uncertainty (i.e. pixels with a high loss) is configured as a Bayesian neural network that applies variation for instance by way of Monte-Carlo-drop out. Thus, the reliability of the loss determined with the help of the variational autoencoder can be determined by way of variational inference.

LIST OF REFERENCE NUMERALS

Figure 1:
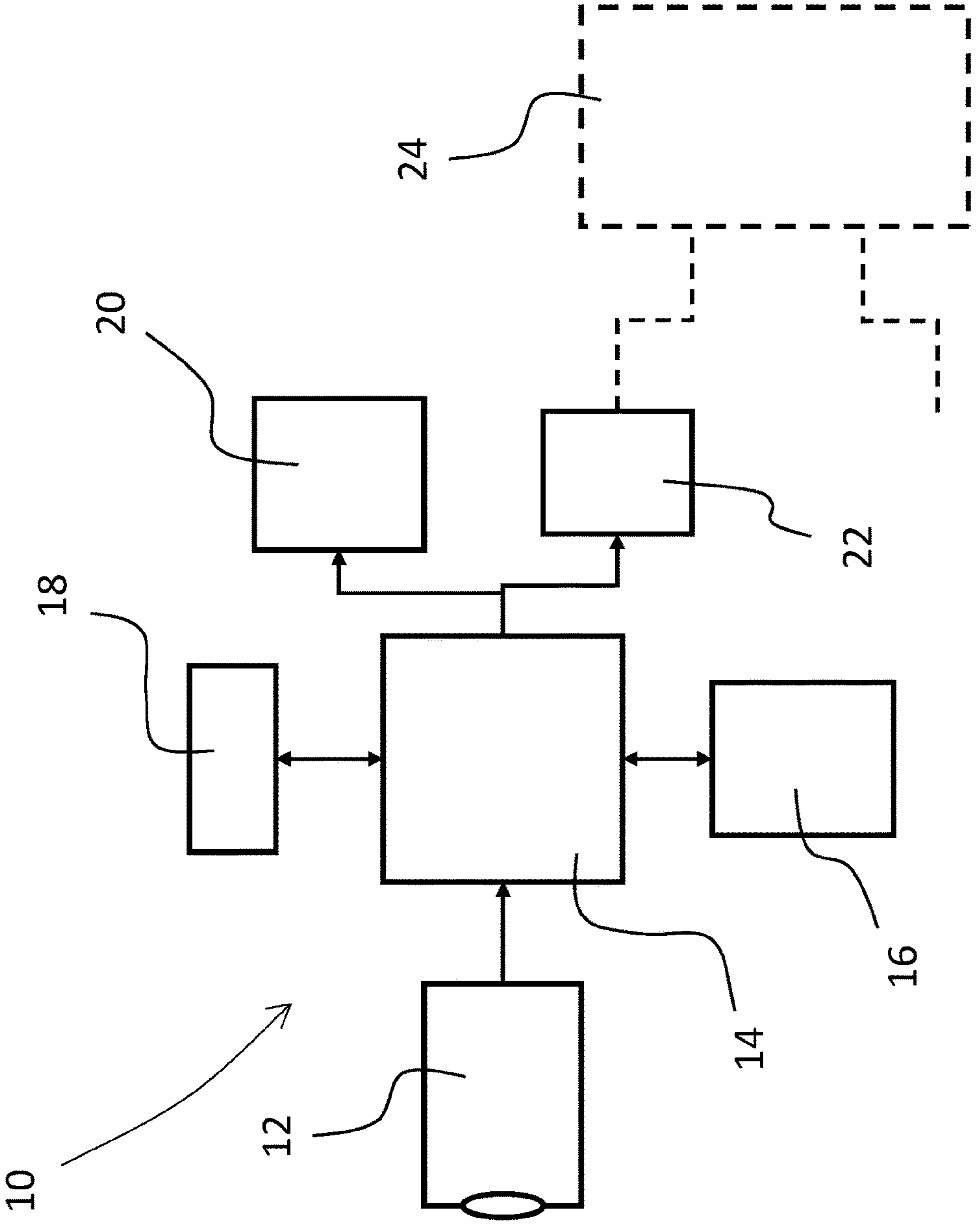
Figure 2:
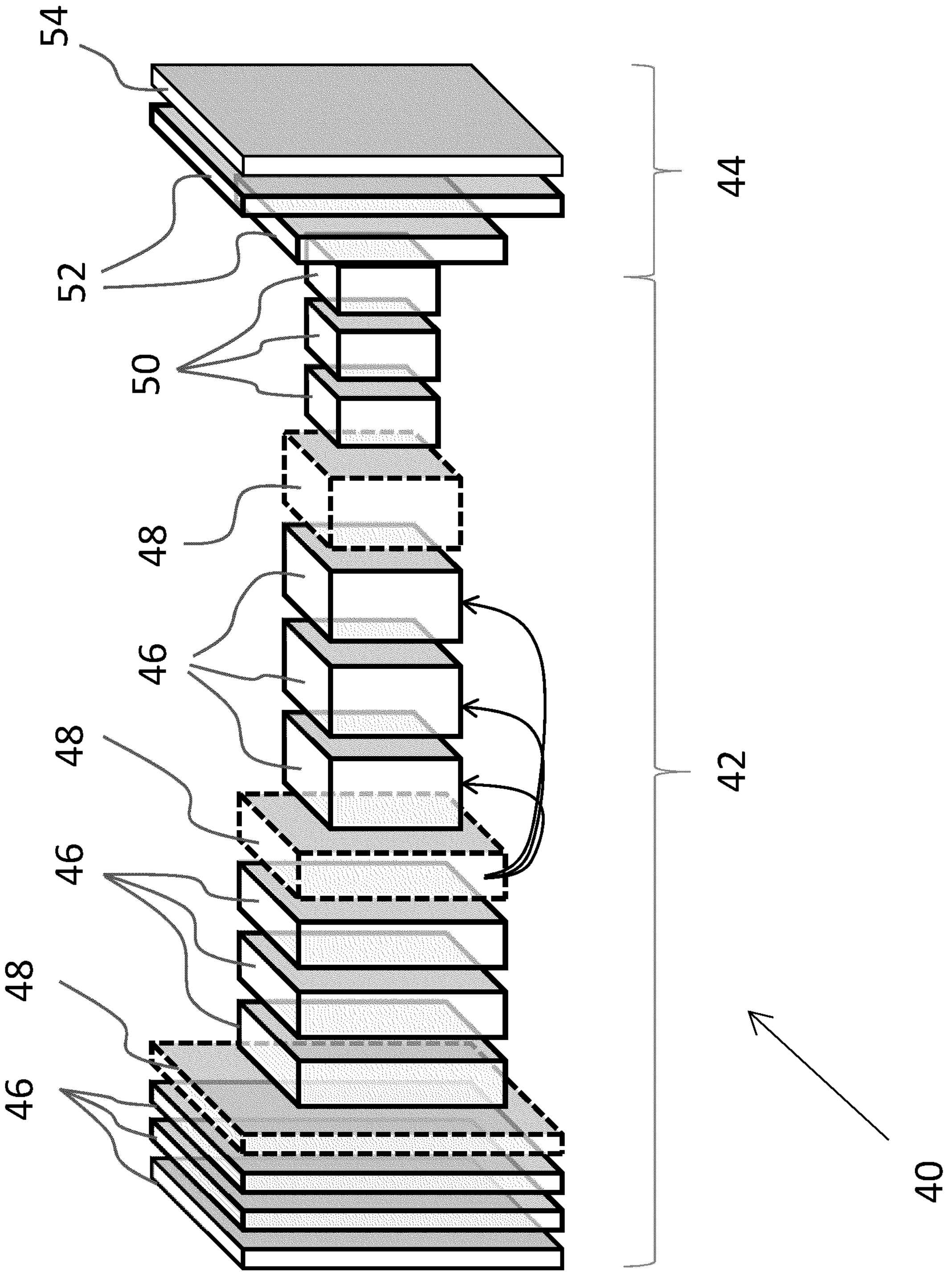
Figure 3:
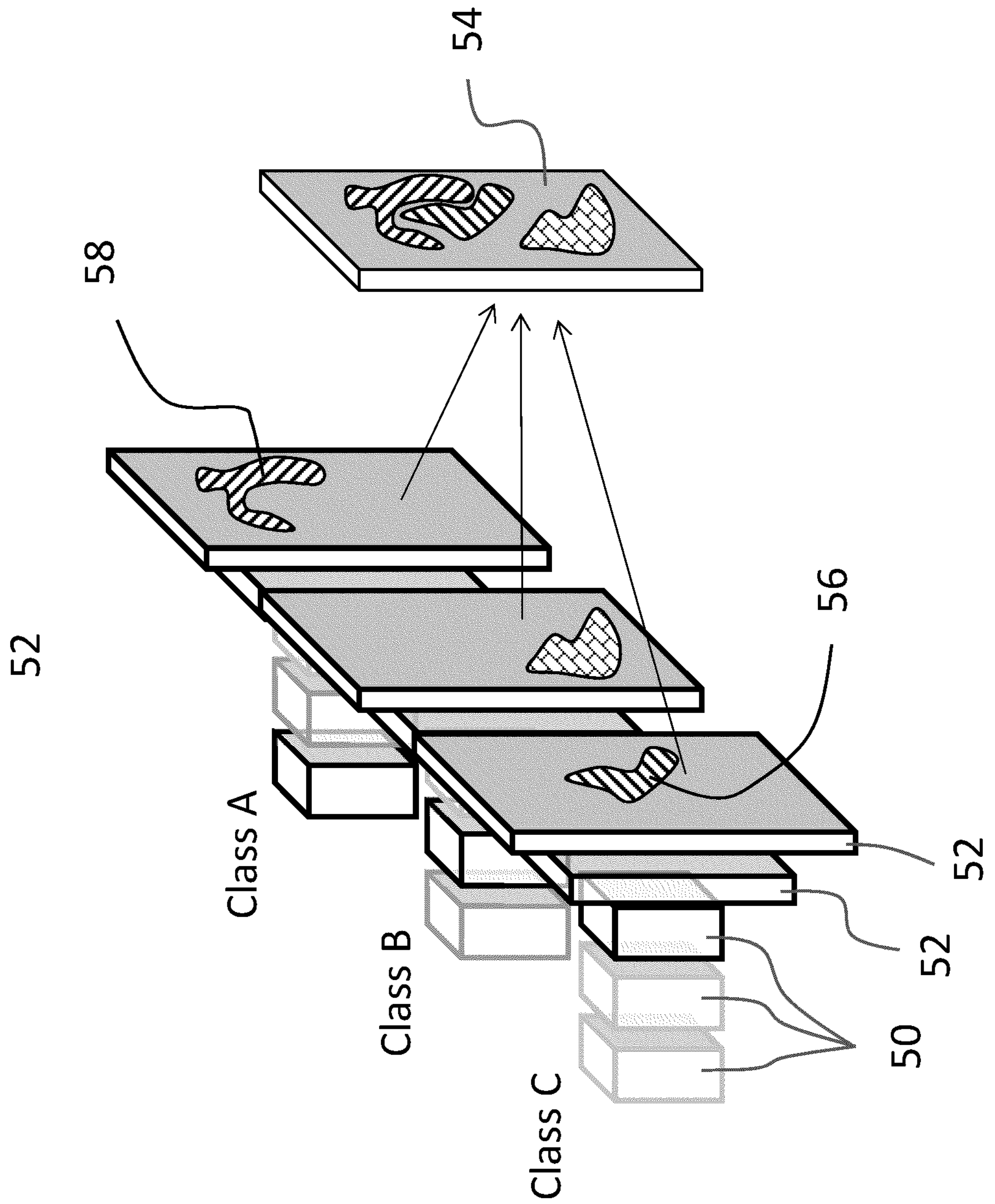
Figure 4:
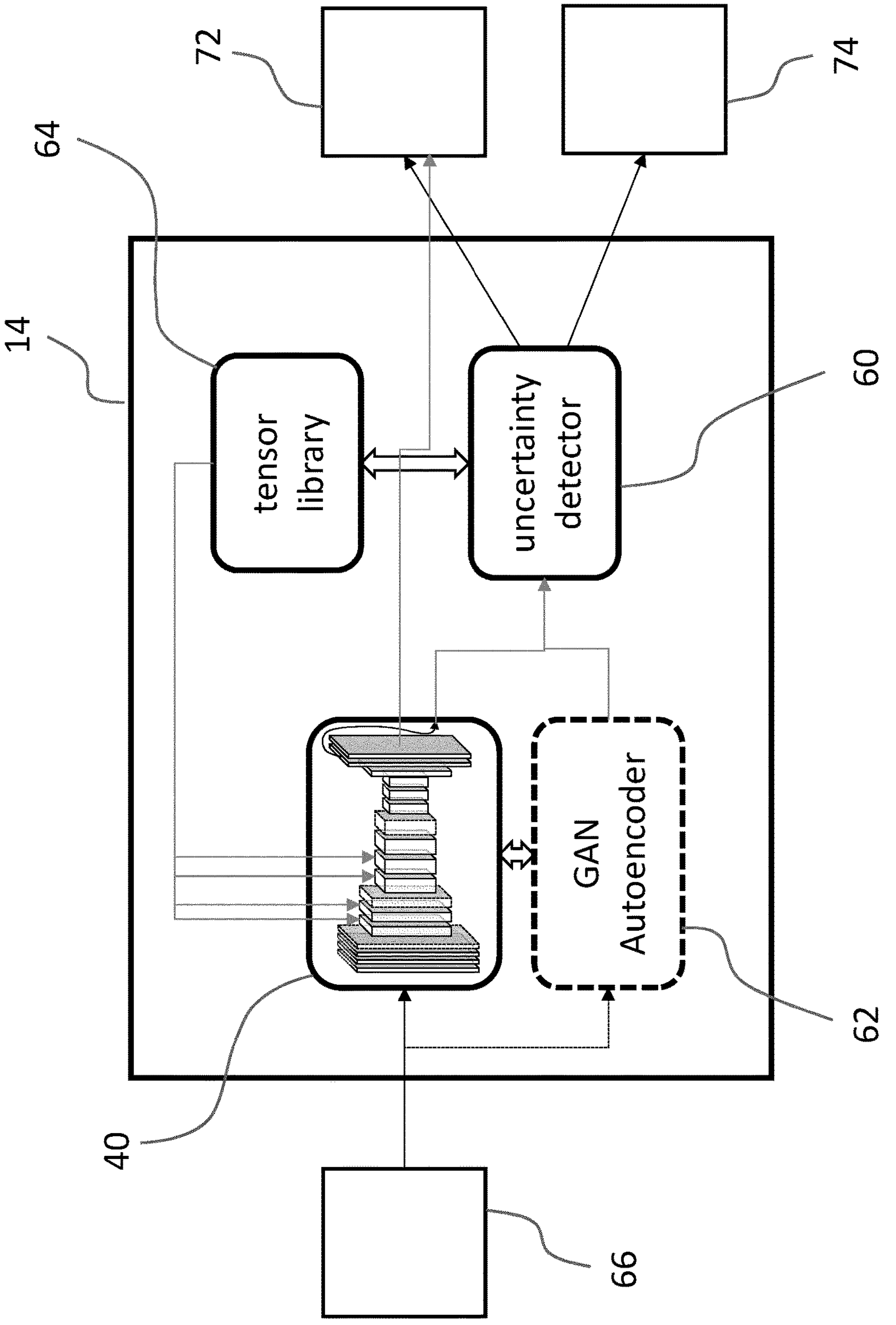
Figure 5:
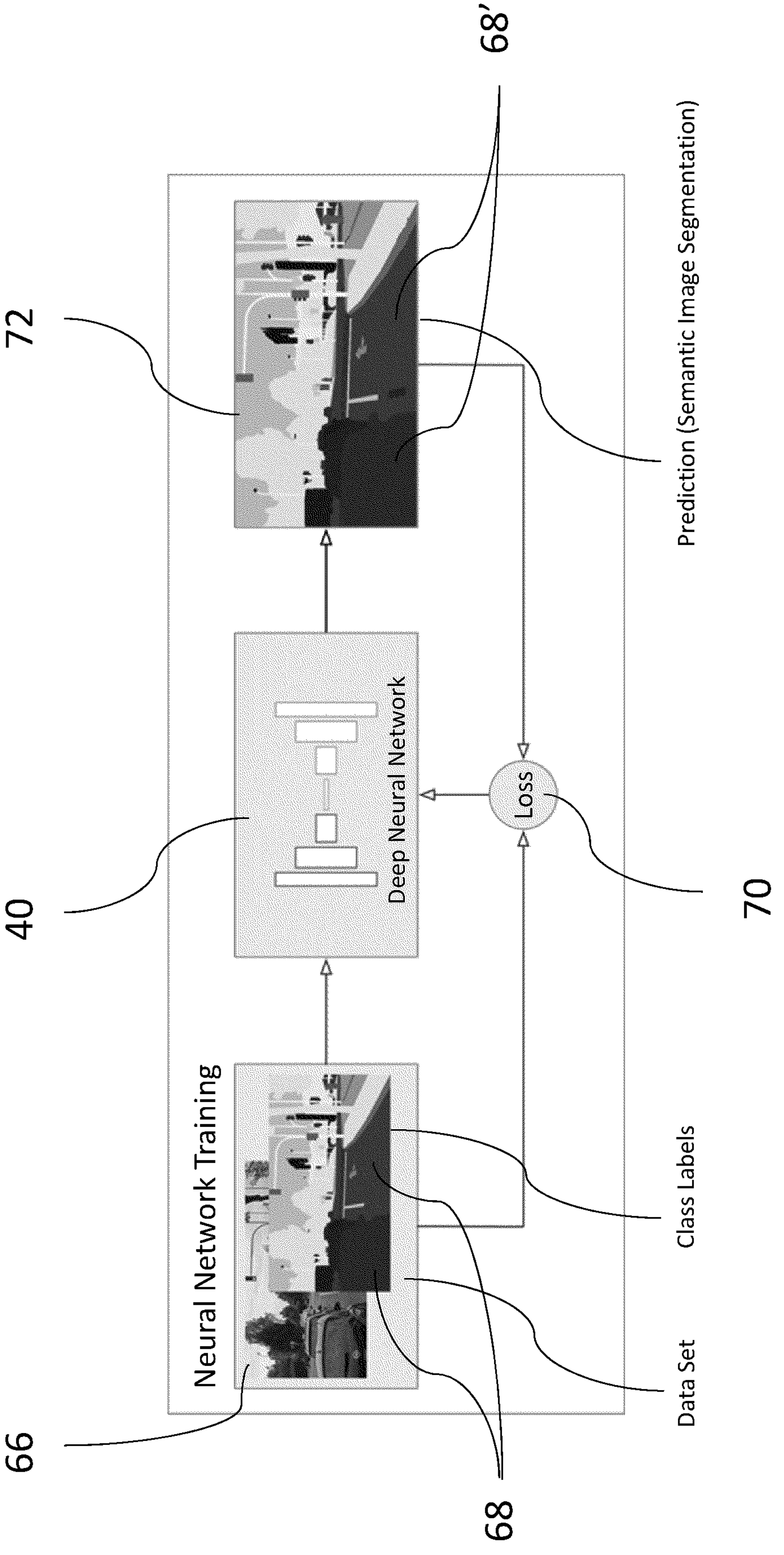
Figure 6:
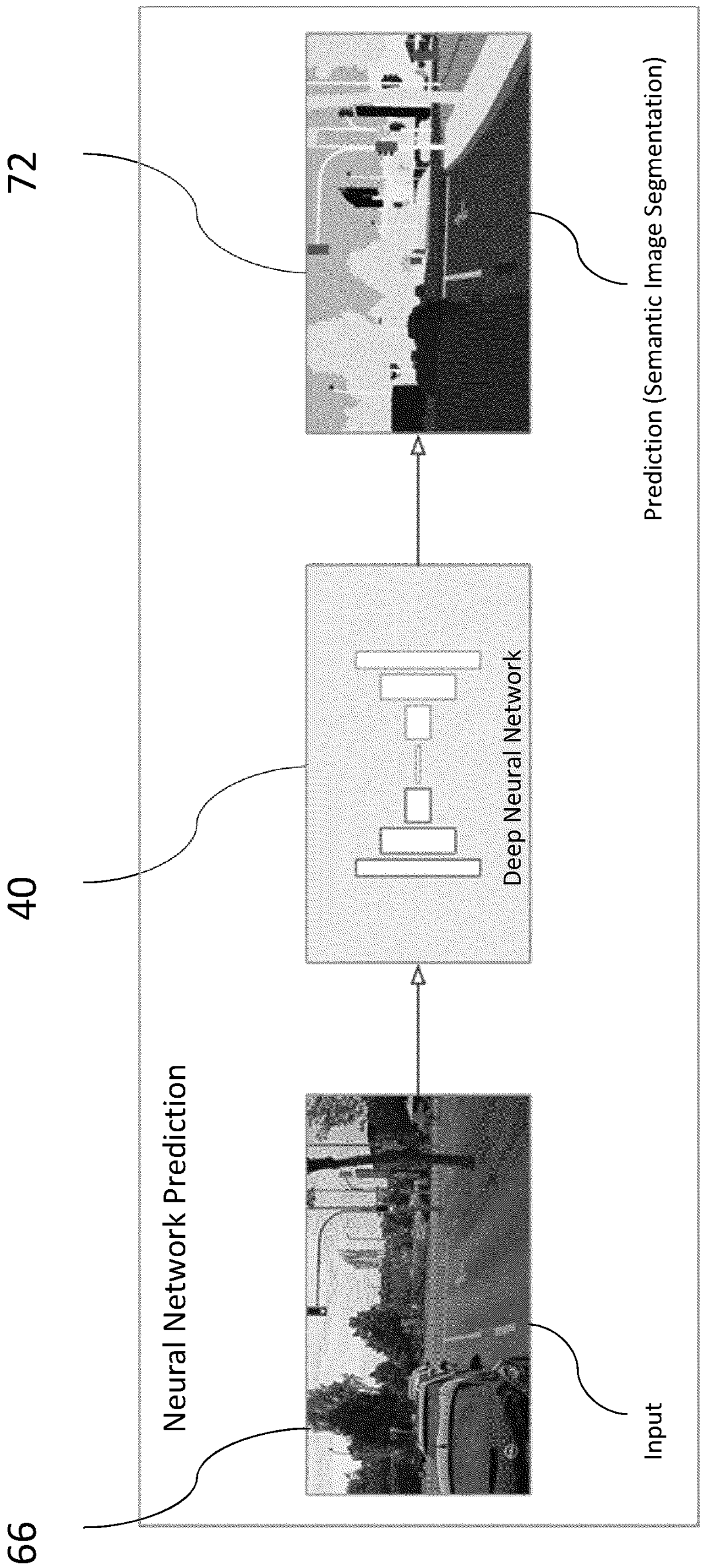
Figure 7:
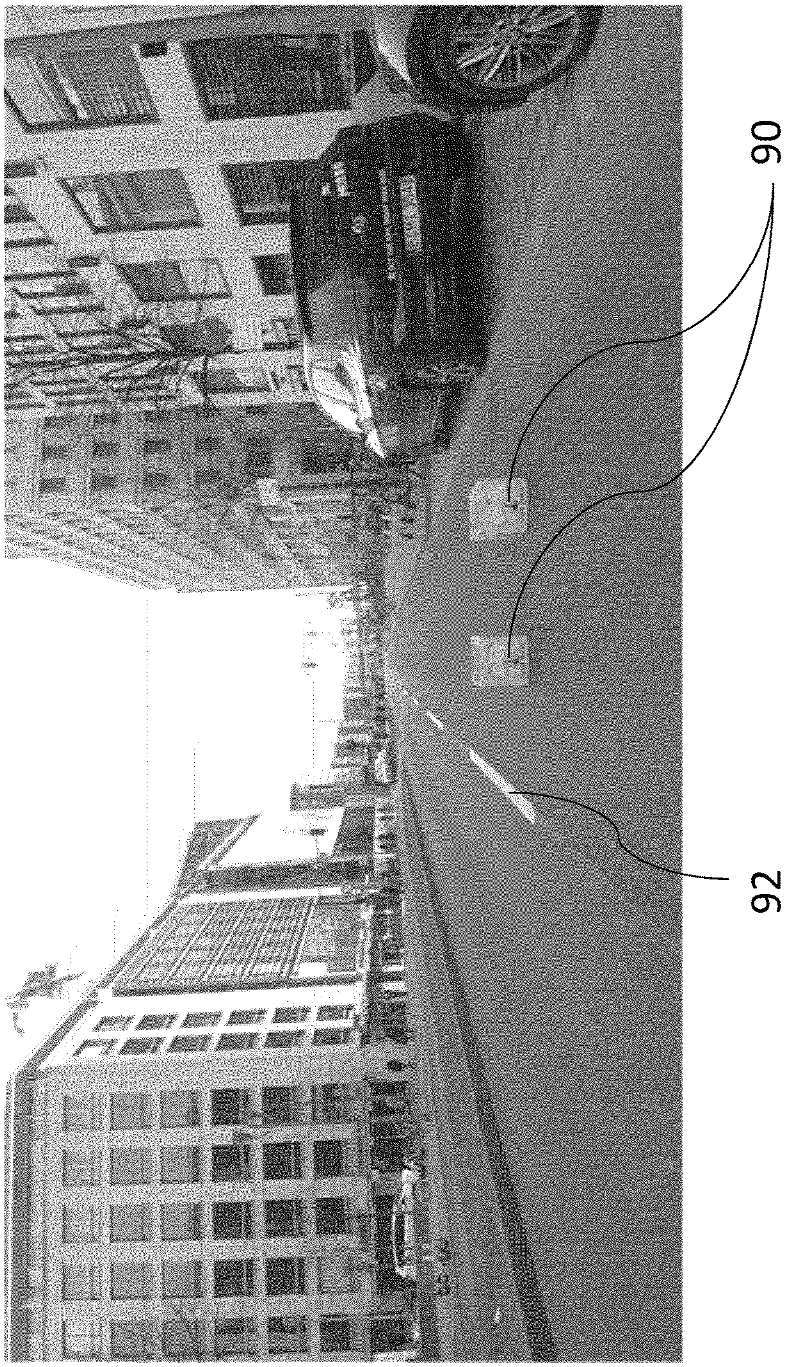
Figure 8:
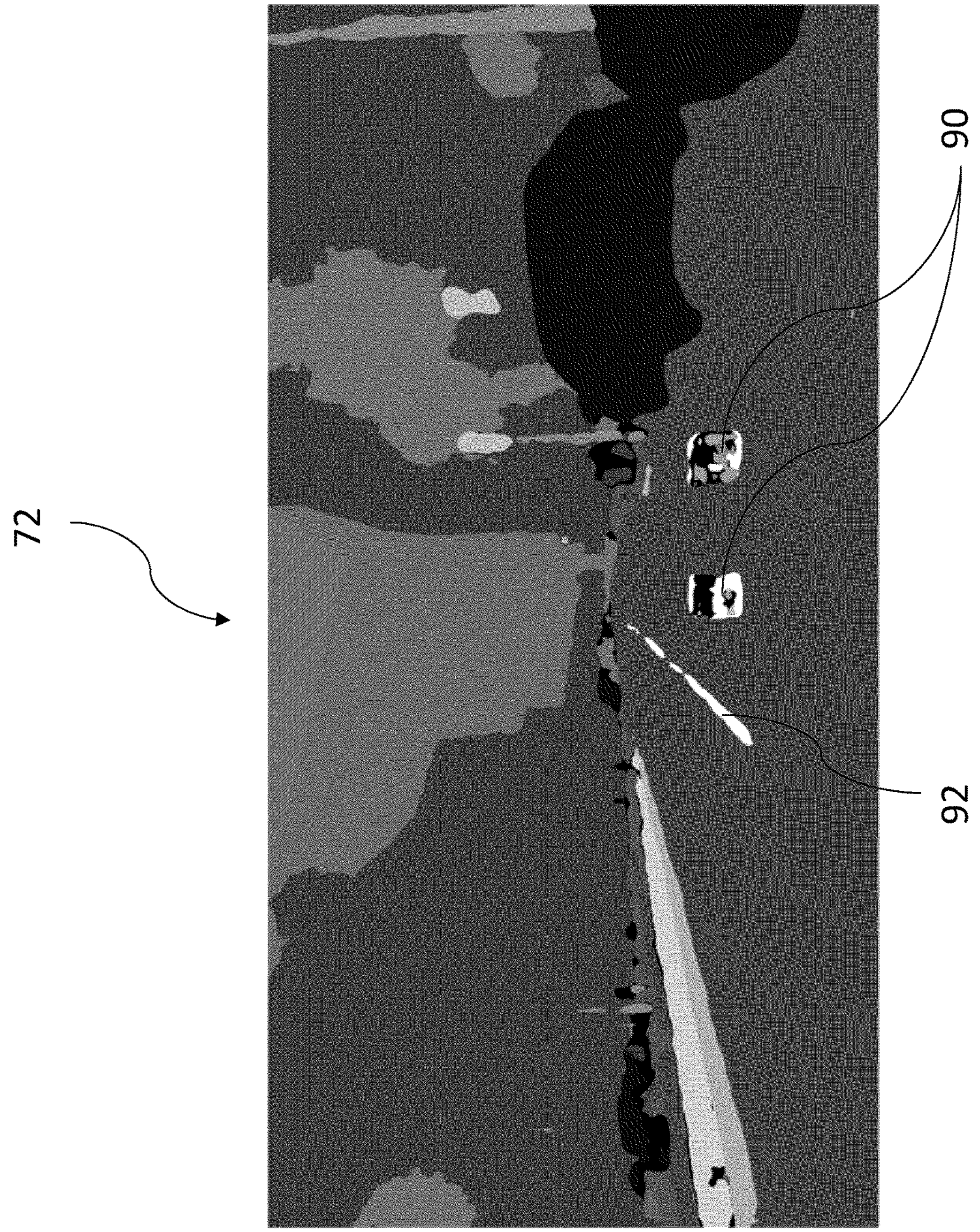
Figure 9:
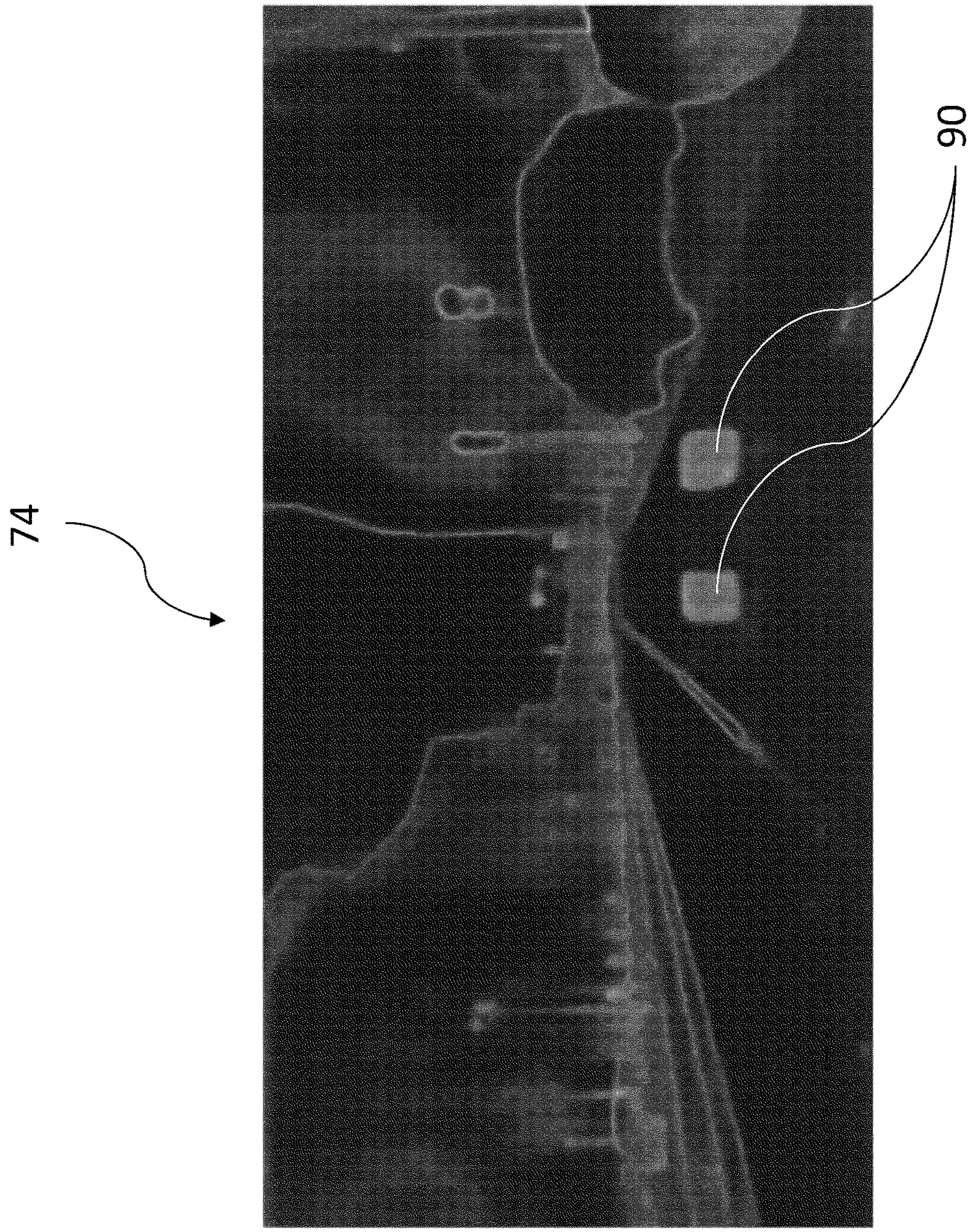
Figure 10:
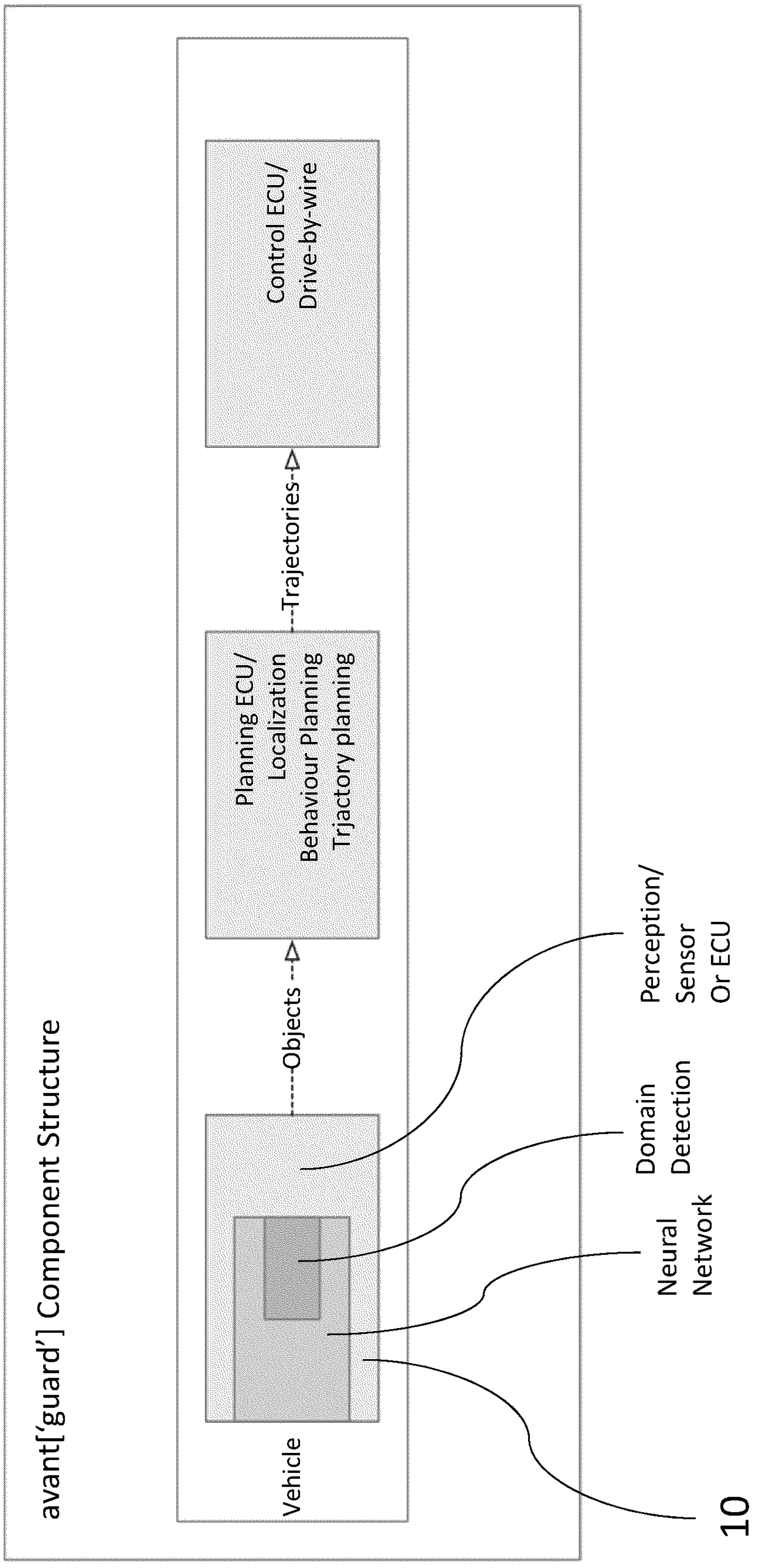
Figure 11:
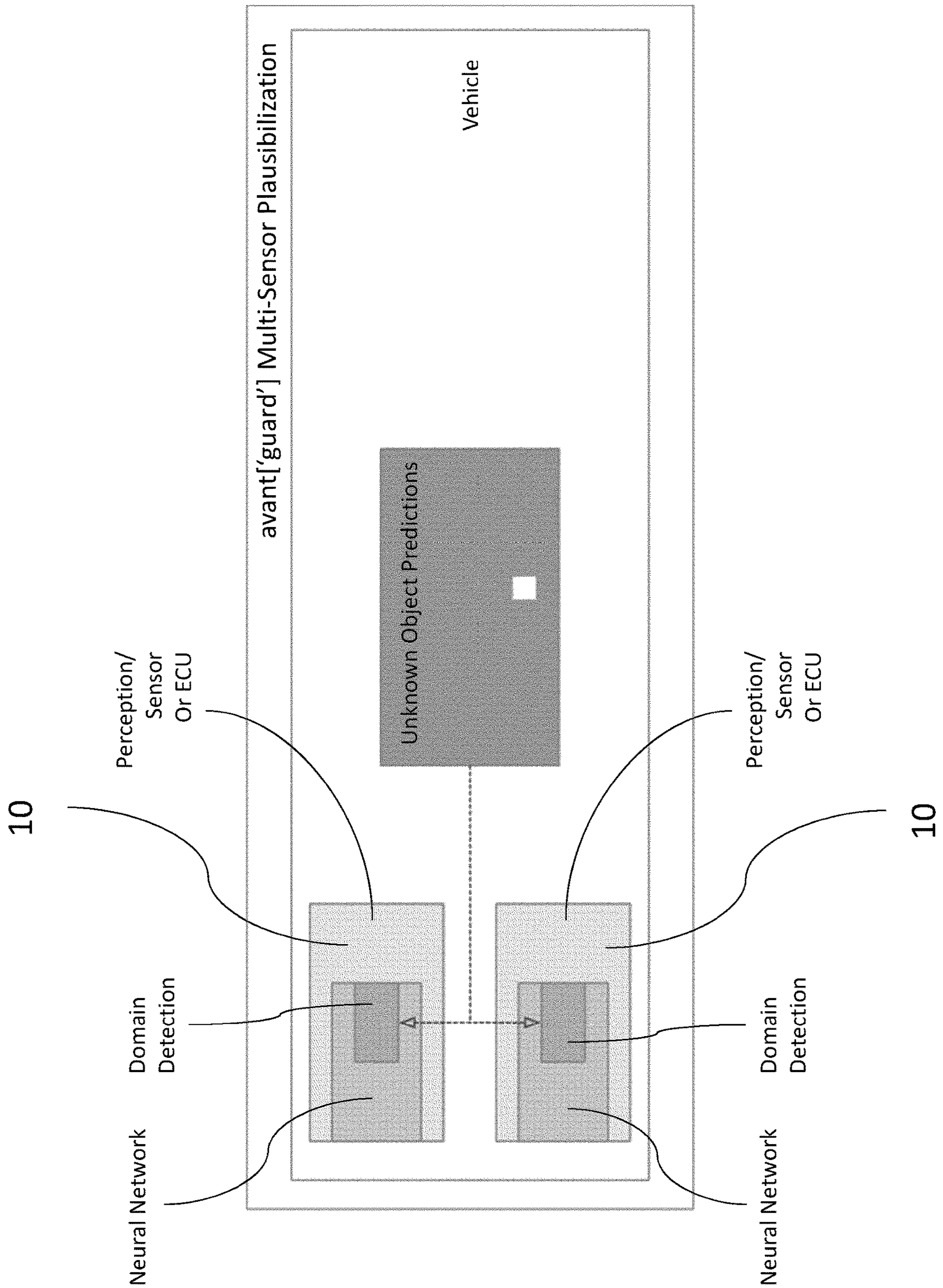
Figure 12:
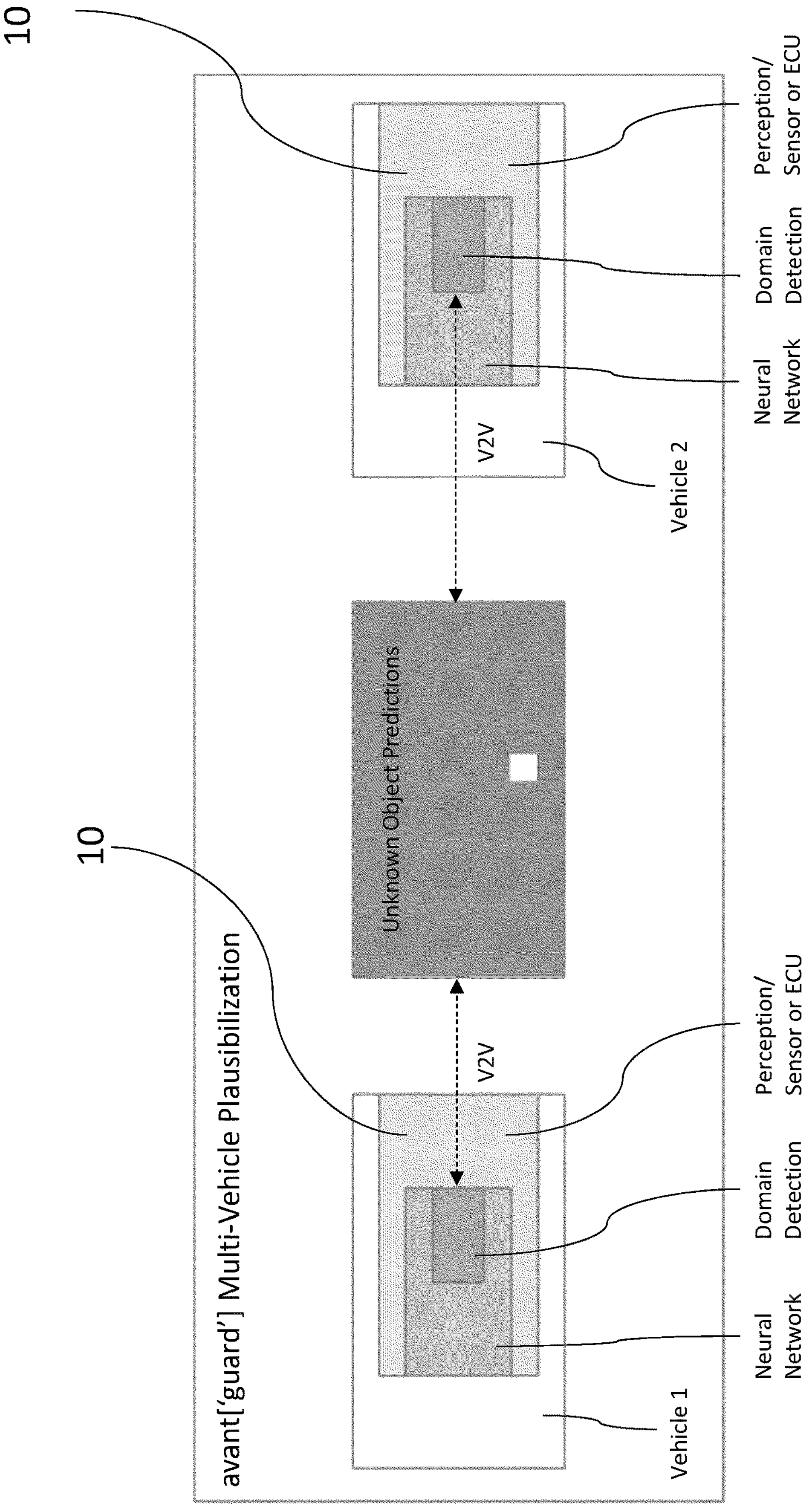
Figure 13:
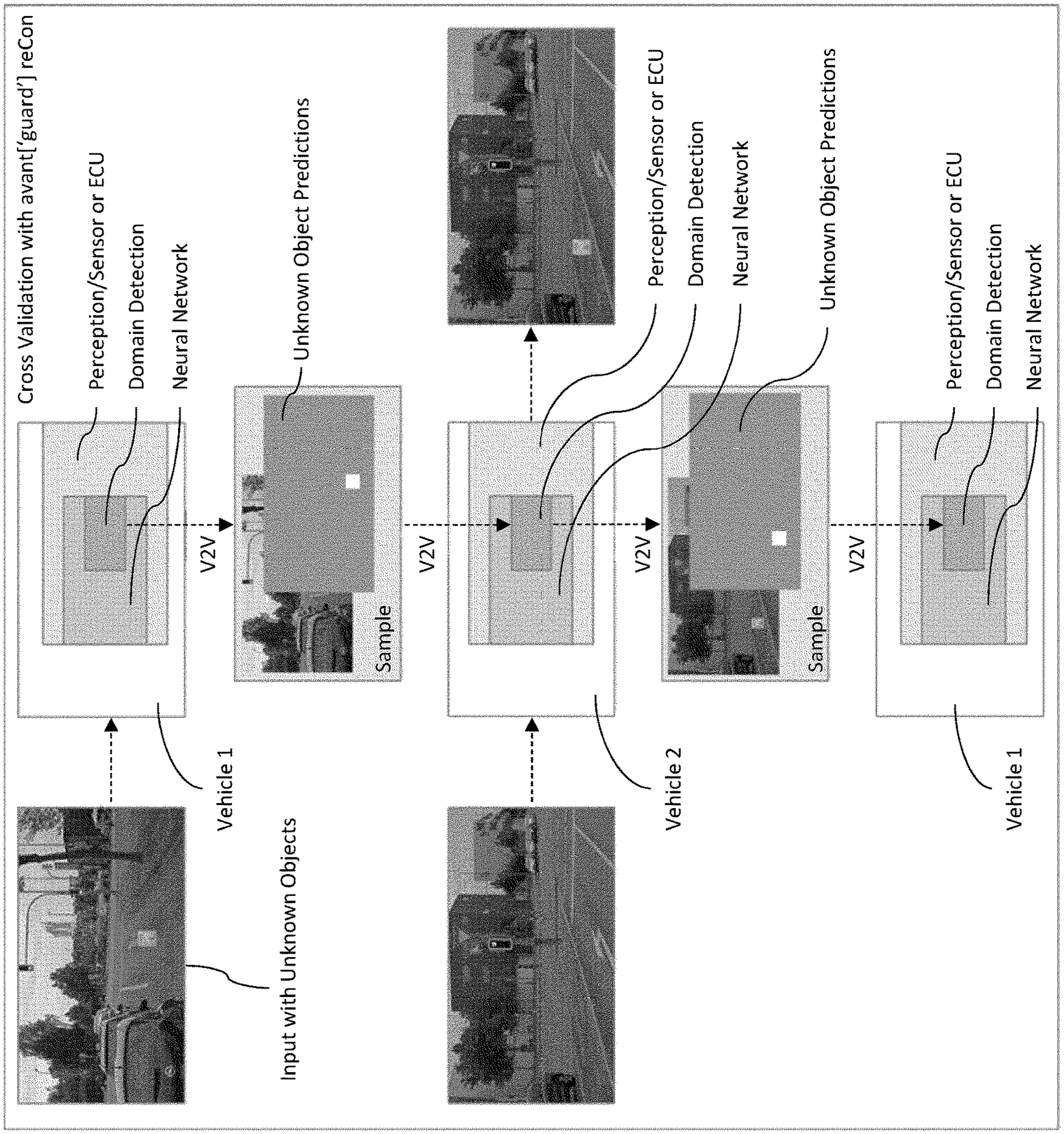
Figure 14:
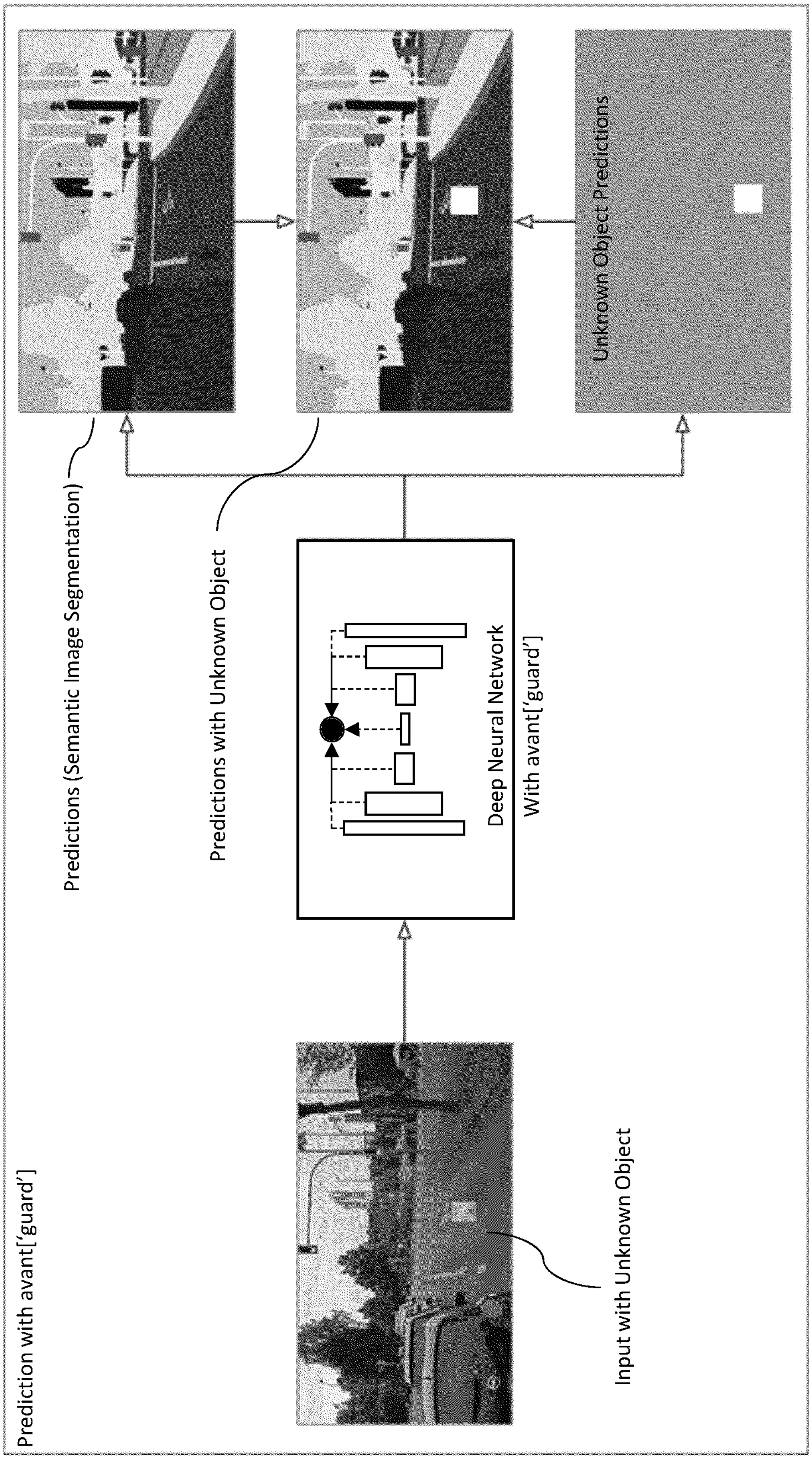
Figure 15:
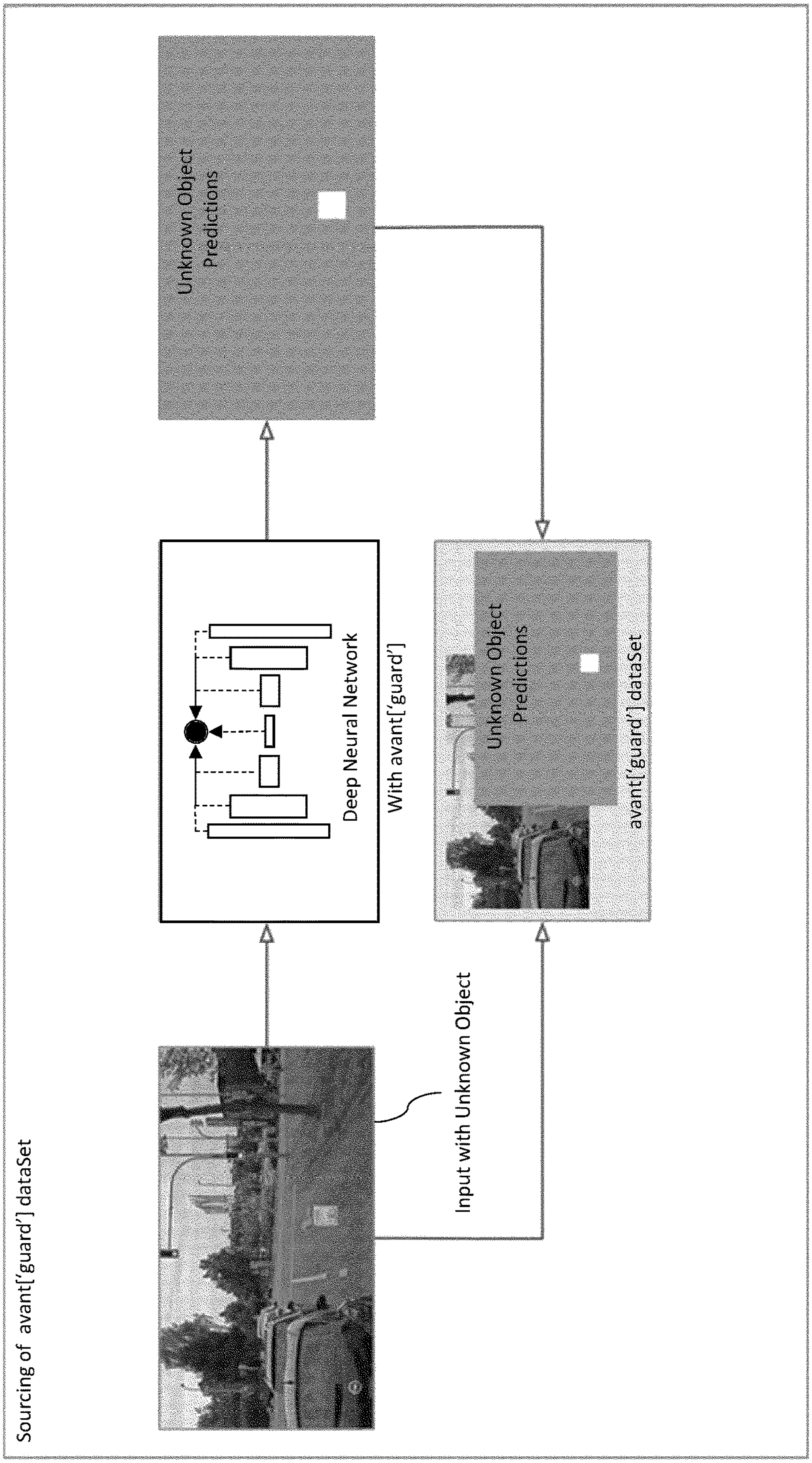
Figure 16:
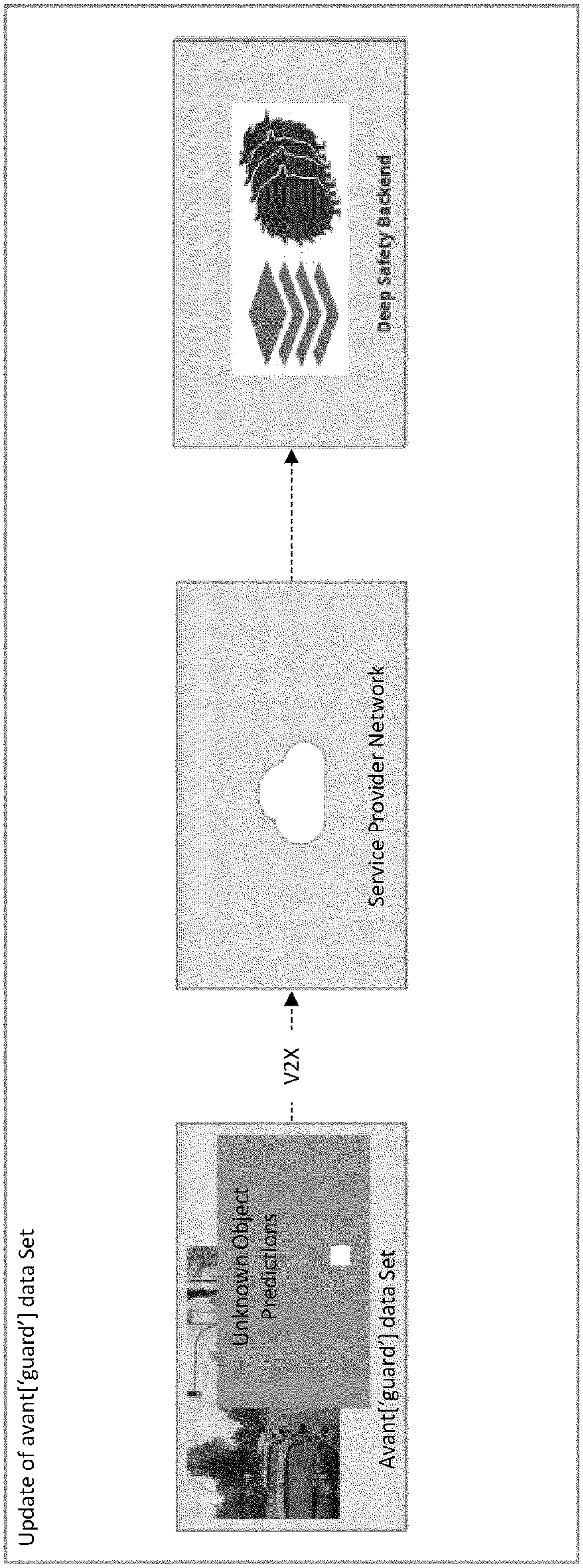
Figure 17:
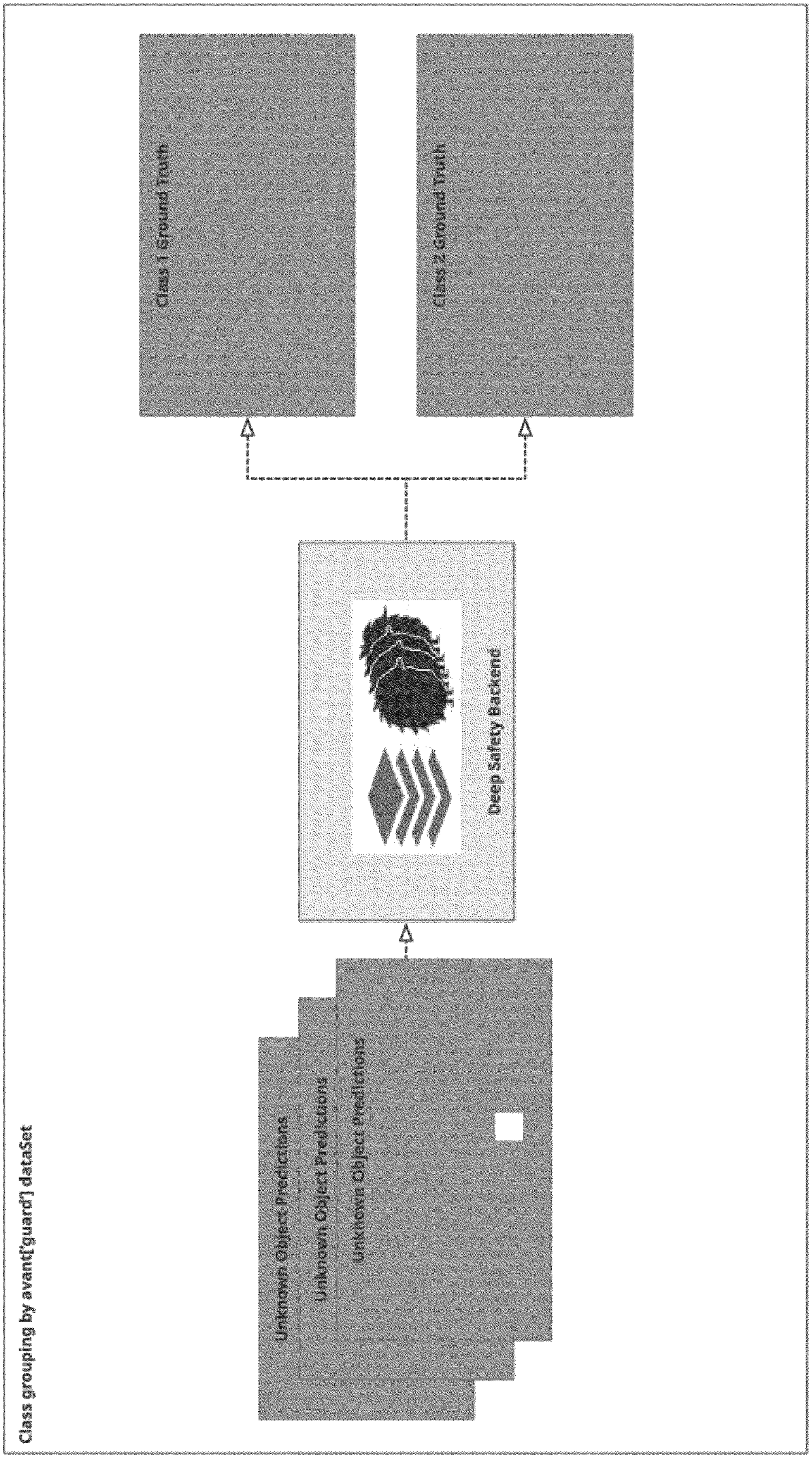
Figure 18:
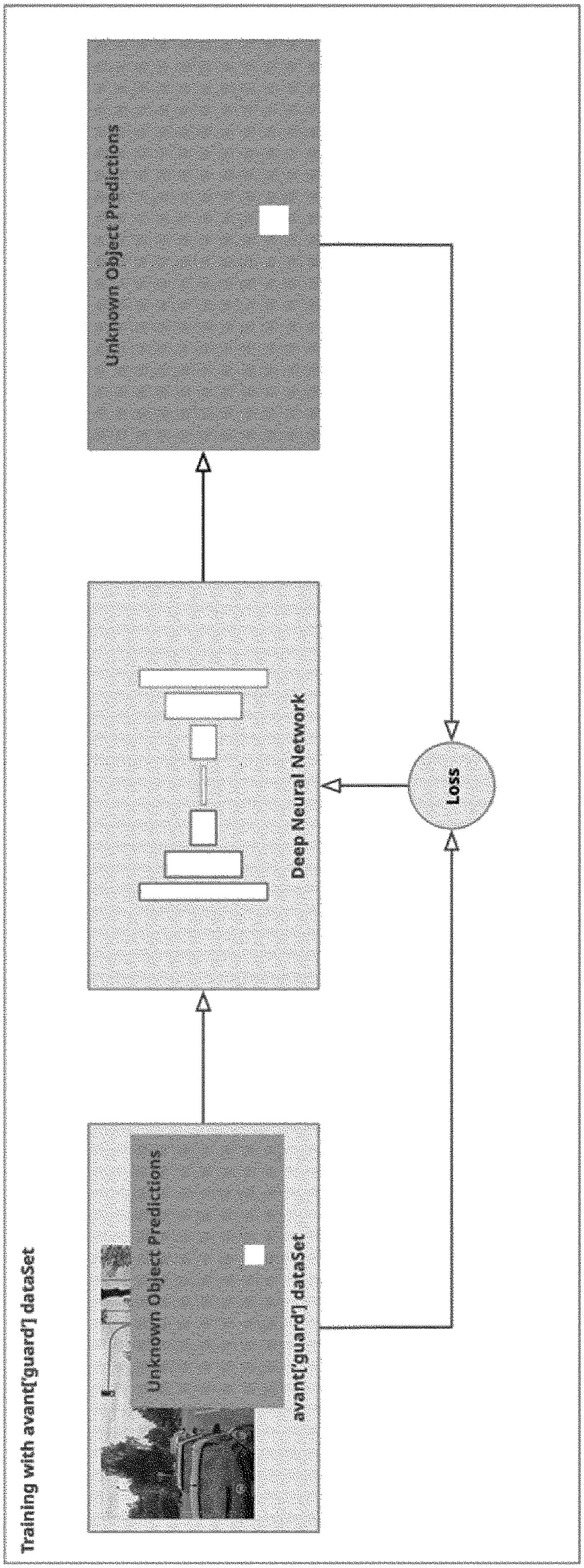
Figure 19:
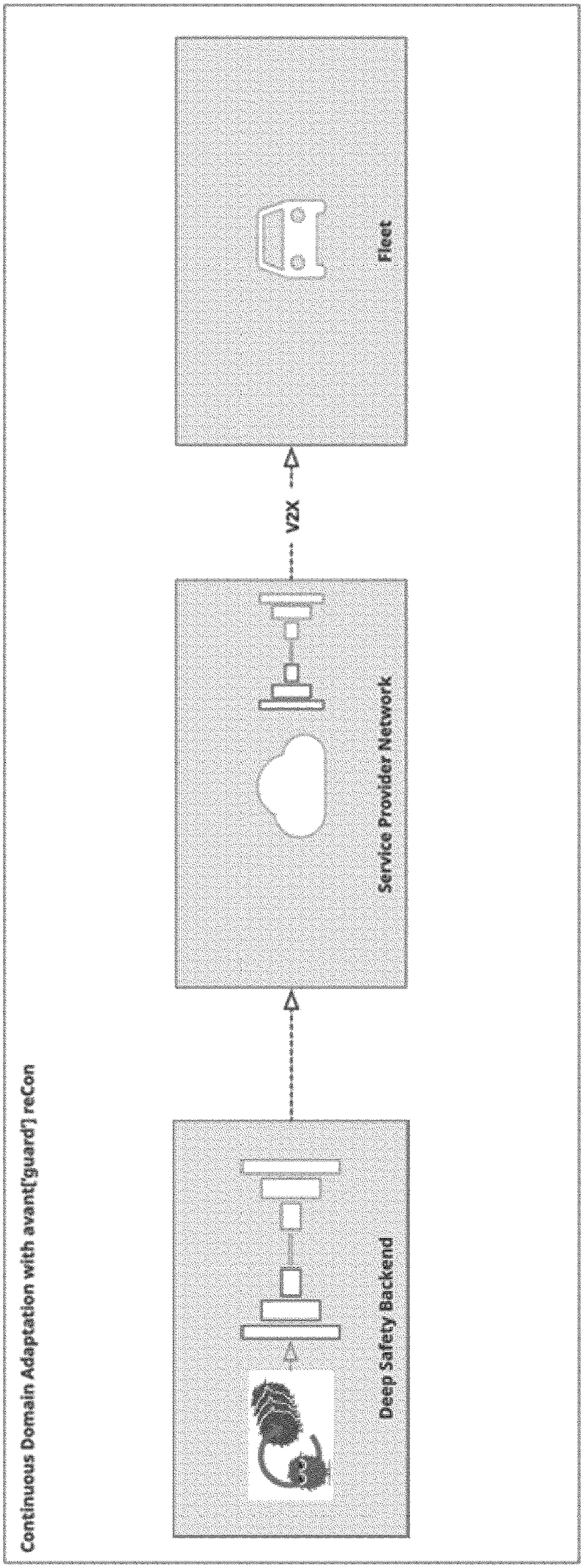
Figure 20:
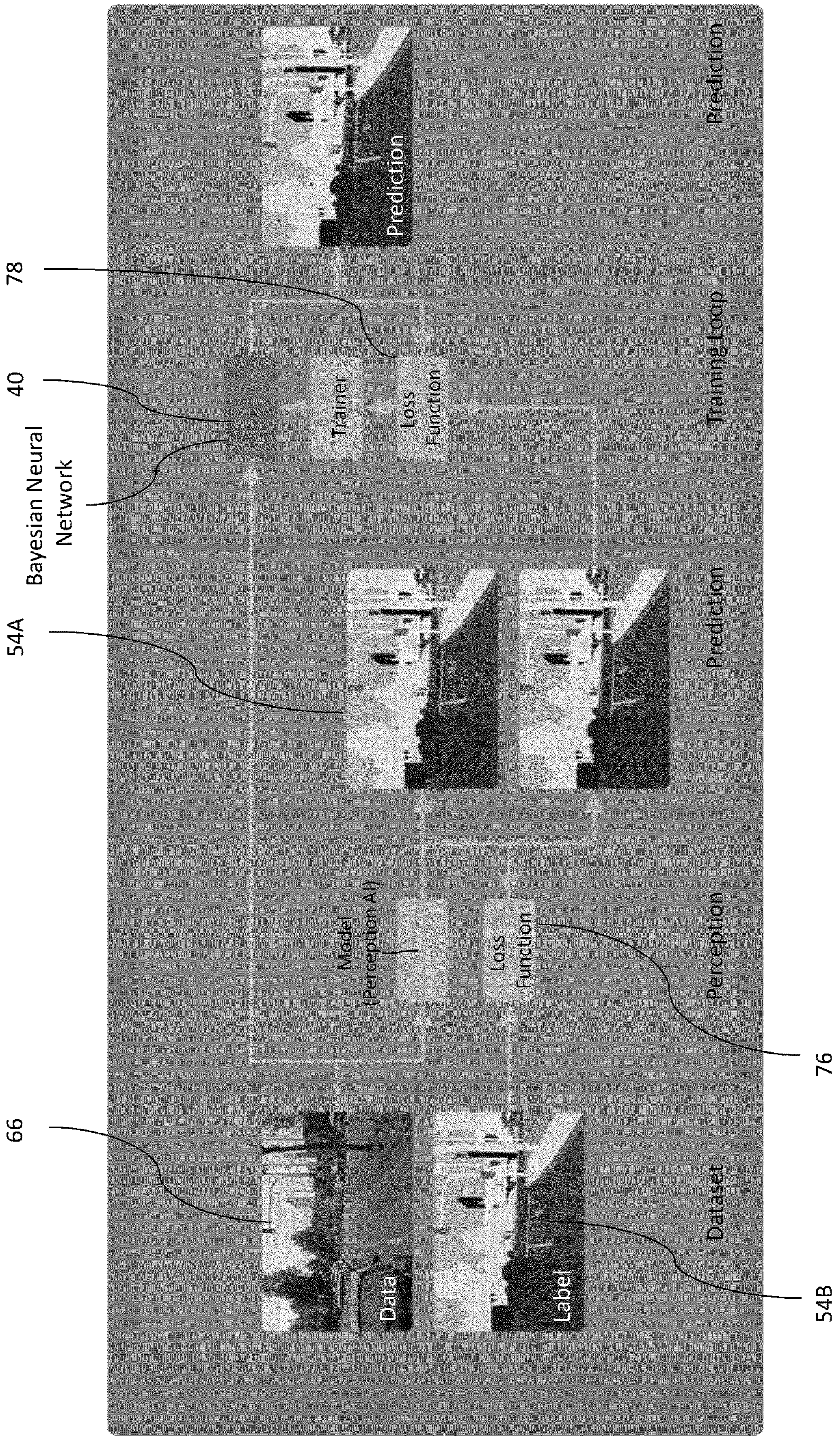
Figure 21:
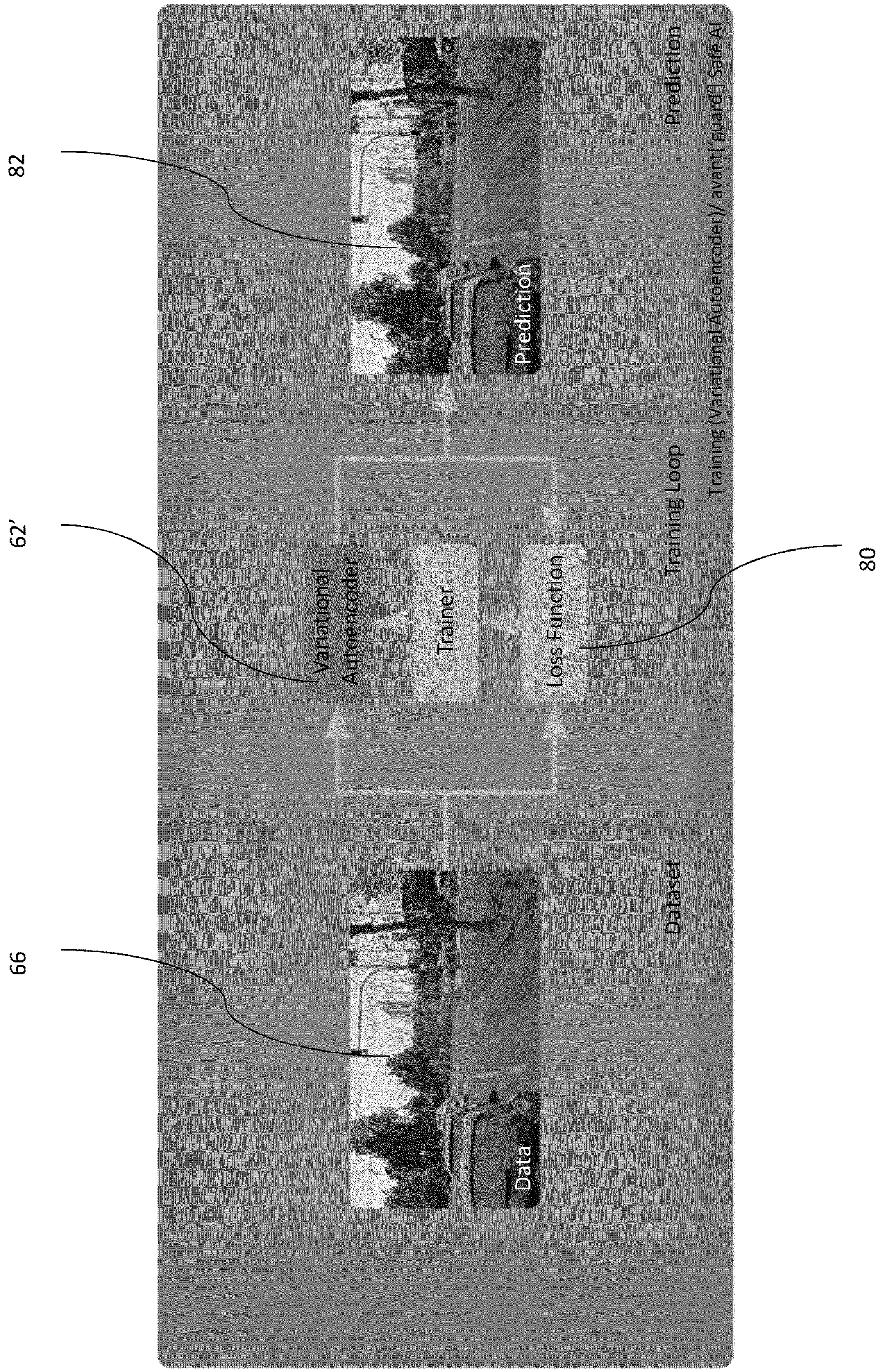
Figure 22:
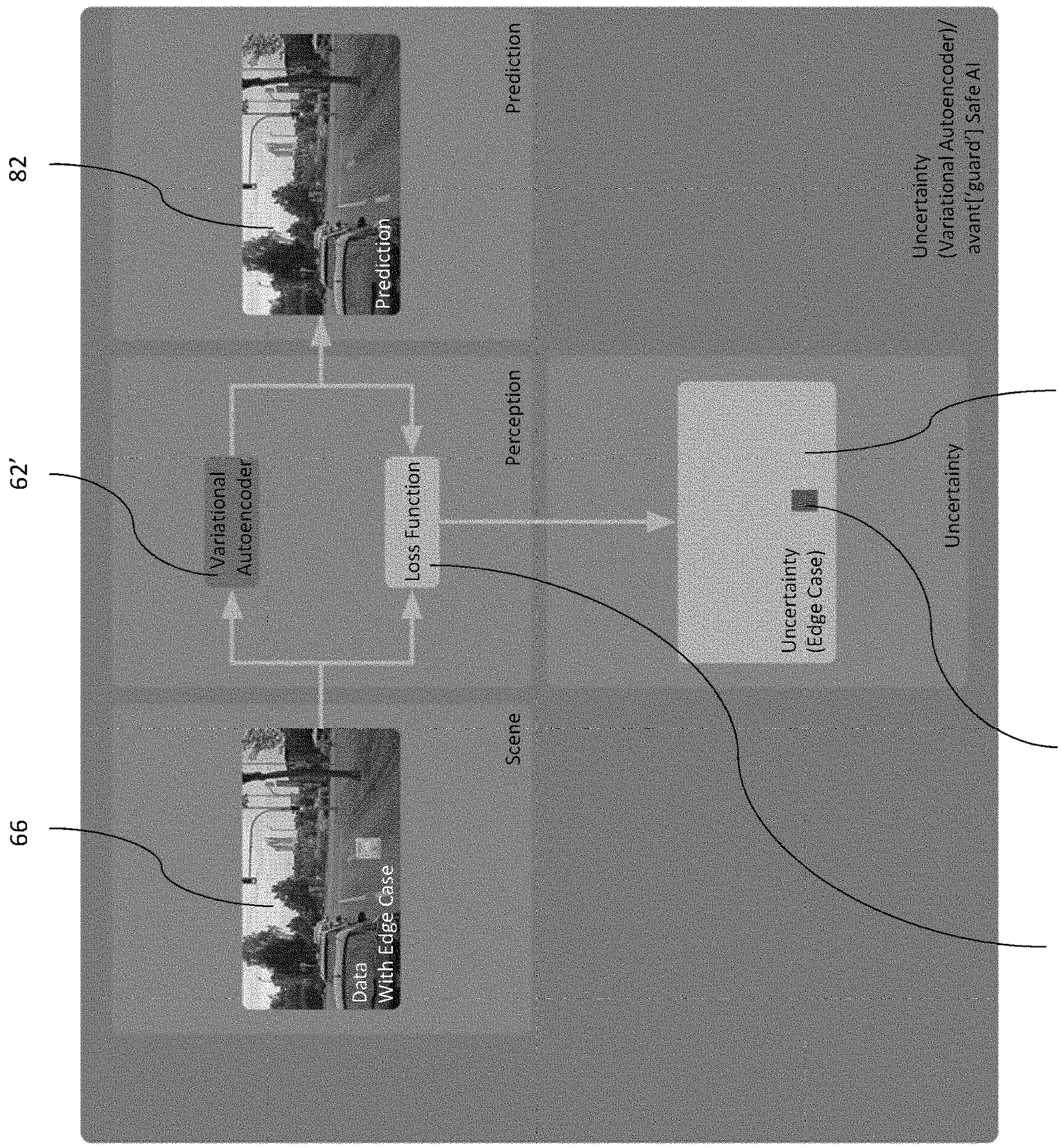
Figure 23:
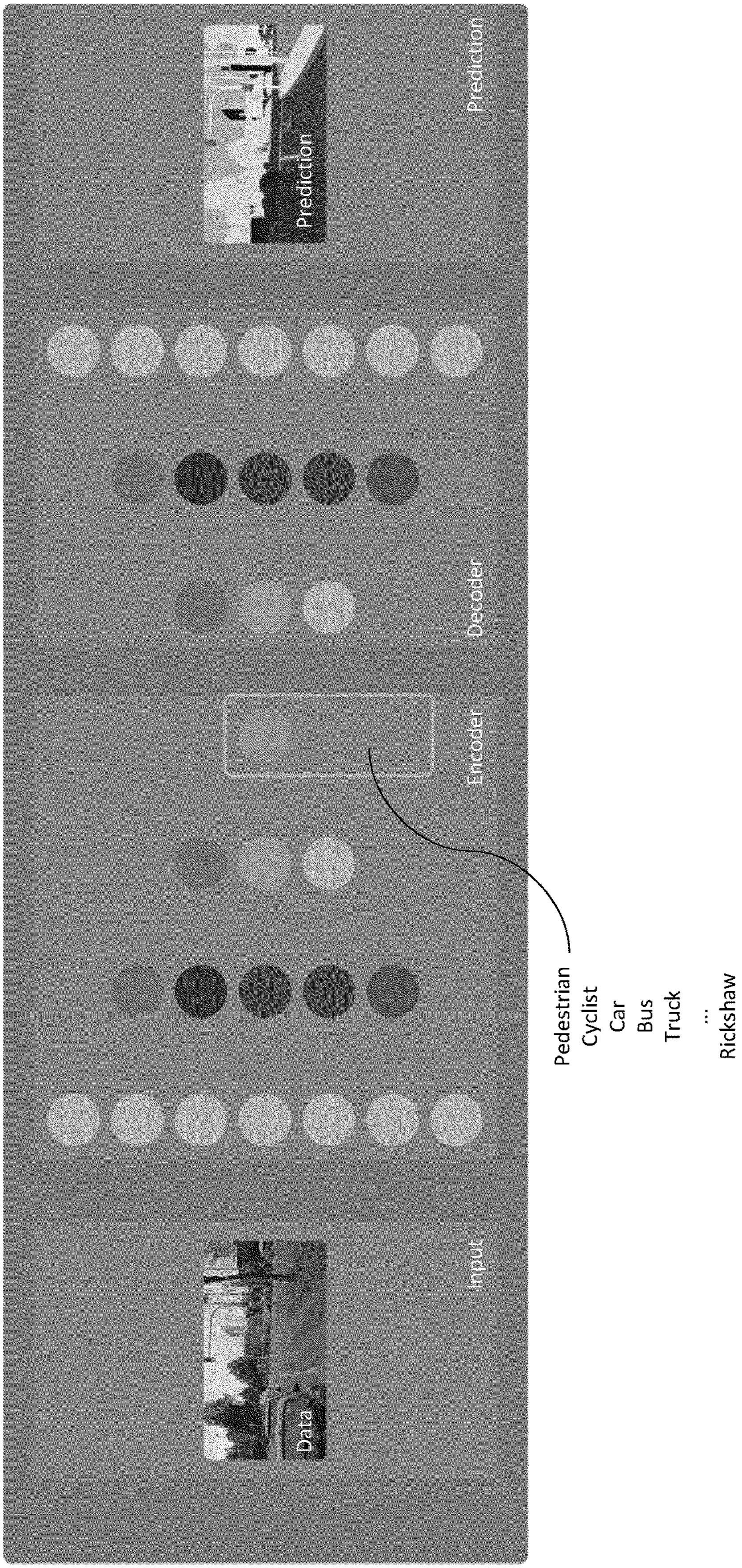
FIG. 23 illustrates the use of one-shot learning in order for an uncertainty detector to suggest the most likely class for a pixel belonging to an unknown object by similarity to the known classes.
Figure 24:
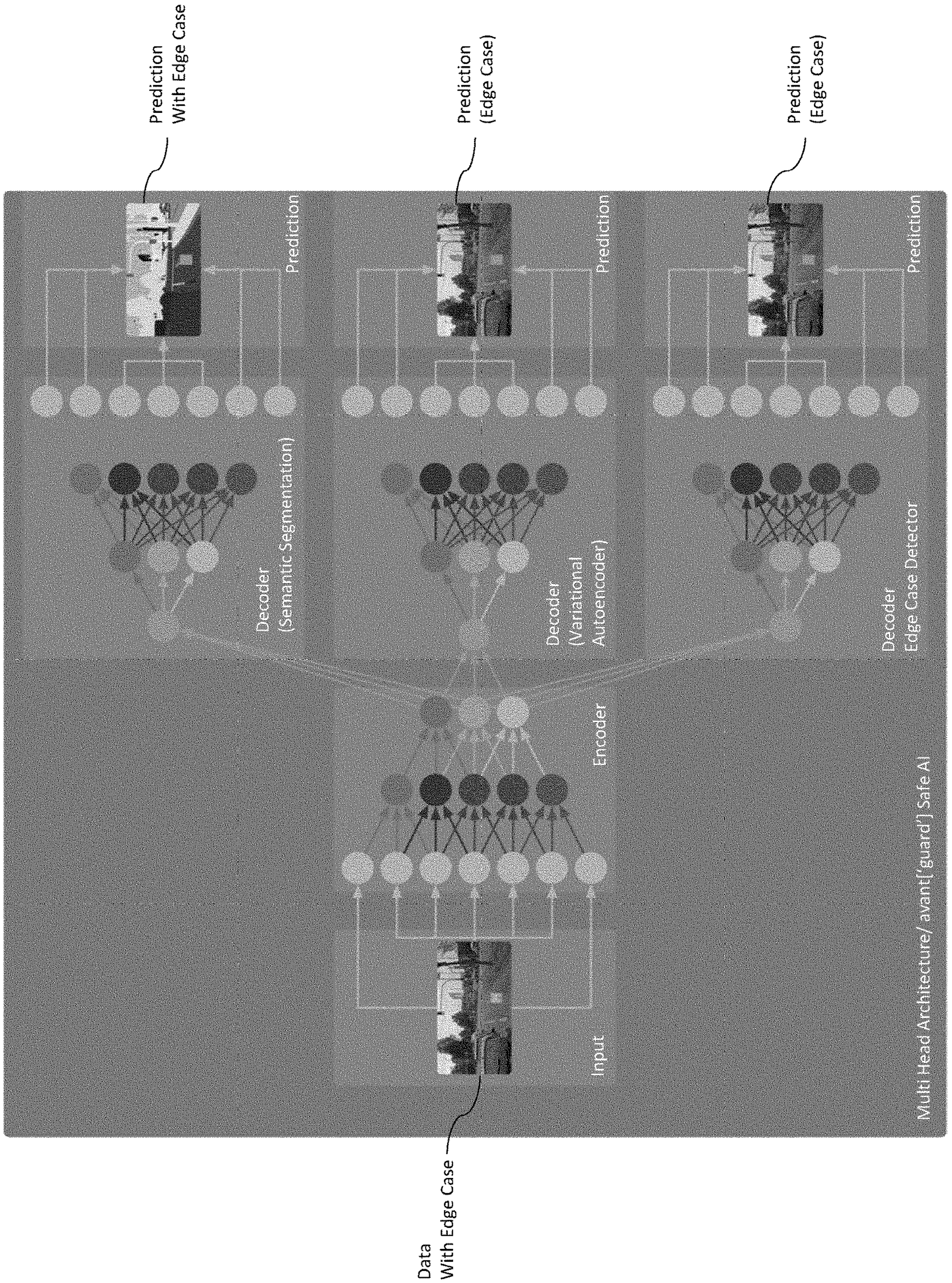
FIG. 24 illustrates that multiple parallel redundant uncertainty detectors 60 can be execute in a parallel redundant architecture, with all uncertainty detectors 60 sharing one common encoder network.

10 vision system
12 camera
14 data processing unit
16 memory
18 communication interface
20 display unit
22 output data interface
24 sensor fusion system
40 segmenting neural network
42 encoder part
44 decoder part
46 convolutional layers
48 pooling layers
50 feature map
52 feature score map
54 segment map
54A, 54B segment map
56 segment
58 segment
60 uncertainty detector
62 generative neural network
62' variational autoencoder
64 tensor library
66 image pixel matrix
68, 68' label
70 loss function
72 segment map
74, 74' uncertainty score map
76 loss function
78 loss function
80 loss function
82 prediction of a generative neural network
90 unknown object (box)
92 known object (street marking)

What is claimed is:

1. A perception system, comprising:

a segmenting neural network that is configured and trained for segmentation of an input image pixel matrix to thus generate a segment map composed of elements that correspond to the pixels of the input image pixel matrix, each element of the segment map being assigned to one of a plurality of object classes the segmenting neural network is trained for by way of class prediction, elements being assigned to the same object class forming a segment of the segment map, wherein the perception system further comprises an uncertainty detector that is configured to generate an uncertainty score map composed of elements that correspond to the pixels of the input image pixel matrix, each element of the uncertainty score map having an uncertainty score that is determined by the uncertainty detector and that reflects an amount of uncertainty involved in a class prediction for a corresponding element in the segment map, wherein the uncertainty detector is configured to access feature score maps generated by the segmenting neural network prior to generating the segment map from said feature score maps and to determine the amount of uncertainty and thus the uncertainty score for each element of the uncertainty score map by determining a variance of the activation levels of elements of the feature score maps, and wherein the uncertainty detector is configured to determine the amount of uncertainty and thus the uncertainty score for each element of the uncertainty score map by determining an inter-sample variance of the activation levels of an element of a feature score map in different samples of the feature score map.

2. The perception system according to claim 1, wherein the uncertainty detector is configured to generate inter-sample variances of the activation levels of an element of a feature score map in different samples of the feature score map by processing an input image pixel matrix with the segmenting neural network in multiple passes while for each pass the segmenting neural network is randomly modified.

3. The perception system according to claim 2, wherein the random modification of the segmenting neural network includes at least one of dropping nodes from a convolutional layer of the segmenting neural network, altering activation functions in at least some nodes of at least some layers of the segmenting neural network and/or introducing noise in at least some nodes of at least some layers of the segmenting neural network.

4. The perception system according to claim 1, wherein the uncertainty detector is configured to determine an inter-sample variance of the activation levels of corresponding elements of feature score maps that are generated from consecutive image pixel matrices corresponding to frames of a video sequence.

5. The perception system according to claim 1, wherein the uncertainty detector comprises a generative neural network, in particular a variational autoencoder that is trained for the plurality of object classes, the segmenting neural network is trained for, wherein a reconstruction loss between the input image pixel matrix and a predicted image pixel matrix reconstructed by the generative neural network corresponds to the amount of uncertainty.

6. The perception system according to claim 1, wherein the uncertainty detector is configured for:

detecting regions in the uncertainty score map that are composed of elements having a high uncertainty score; and labeling those regions that are composed of elements having a high uncertainty score as candidates for representing an object of a yet unknown object class.

7. A method for segmentation of input image pixel matrices by way of class prediction performed by a segmenting neural network and for determining an amount of uncertainty involved in the class predictions for each pixel of an input image pixel matrix, said method comprising:

segmenting an input image pixel matrix by means of a segmenting neural network that is trained for a plurality of object classes and that generates for each object class a feature score map and therefrom a segment map for the input image pixel matrix by assigning elements of the segment map to one of a plurality of object classes the segmenting neural network is trained for by way of class prediction, elements being assigned to the same object class forming a segment of the segment map; and generating an uncertainty score map composed of elements that correspond the pixels of the input image pixel matrix, each element of the uncertainty score map having an uncertainty score that is determined by the uncertainty detector and that reflects an amount of uncertainty involved in a class prediction for a corresponding element in the segment map, wherein the uncertainty score is determined by determining an inter-class variance of the activation levels of elements of the feature score maps for different object classes.

8. The method according to claim 7, further comprising:

detecting a region in the uncertainty score map that are composed of elements having a high uncertainty score; and labeling the region that is composed of elements having a high uncertainty score as candidates for representing an object of a yet unknown object class, a high uncertainty score being an uncertainty score that is higher than an average uncertainty score of all elements of the uncertainty score map.

9. The method according to claim 8, further comprising:

creating a new object class if a region that is composed of elements having a high uncertainty score is detected, said new object class representing objects as shown in a region of the input image pixel matrix corresponding the region in the uncertainty score map that are composed of elements having a high uncertainty score.

10. The method according to claim 7, wherein the method is used in an autonomous vehicle.

11. A perception system, comprising:

a segmenting neural network that is configured and trained for segmentation of an input image pixel matrix to thus generate a segment map composed of elements that correspond to the pixels of the input image pixel matrix, each element of the segment map being assigned to one of a plurality of object classes the segmenting neural network is trained for by way of class prediction, elements being assigned to the same object class forming a segment of the segment map, wherein the perception system further comprises an uncertainty detector that is configured to generate an uncertainty score map composed of elements that correspond to the pixels of the input image pixel matrix, each element of the uncertainty score map having an uncertainty score that is determined by the uncertainty detector and that reflects an amount of uncertainty involved in a class prediction for a corresponding element in the segment map, and wherein the uncertainty detector is configured to determine the amount of uncertainty and thus the uncertainty score for each element of the uncertainty score map by determining inter-class variances between activation levels of corresponding elements of feature score maps for different object classes as provided by the segmenting neural network.

12. A method for segmentation of input image pixel matrices by way of class prediction performed by a segmenting neural network and for determining an amount of uncertainty involved in the class predictions for each pixel of an input image pixel matrix, said method comprising:

segmenting an input image pixel matrix by means of a segmenting neural network that is trained for a plurality of object classes and that generates for each object class a feature score map and therefrom a segment map for the input image pixel matrix by assigning elements of the segment map to one of a plurality of object classes the segmenting neural network is trained for by way of class prediction, elements being assigned to the same object class forming a segment of the segment map; and generating an uncertainty score map composed of elements that correspond to the pixels of the input image pixel matrix, each element of the uncertainty score map having an uncertainty score that is determined by the uncertainty detector and that reflects an amount of uncertainty involved in a class prediction for a corresponding element in the segment map, wherein the uncertainty score is determined by determining an inter-sample variance of the activation levels of elements of different samples of a feature score map for one object class.

* * * * *